United States Patent
Landgren et al.

(10) Patent No.: US 11,706,825 B2
(45) Date of Patent: *Jul. 18, 2023

(54) METHOD AND APPARATUS OF SUPPORTING WIRELESS FEMTOCELL COMMUNICATIONS

(71) Applicant: TANGO NETWORKS, INC., Frisco, TX (US)

(72) Inventors: Patricia A. Landgren, Plano, TX (US); Andrew Silver, Frisco, TX (US)

(73) Assignee: TANGO NETWORKS, INC., Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/578,423

(22) Filed: Jan. 18, 2022

(65) Prior Publication Data
US 2022/0141892 A1    May 5, 2022

Related U.S. Application Data

(63) Continuation of application No. 16/935,090, filed on Jul. 21, 2020, now Pat. No. 11,229,069, which is a
(Continued)

(51) Int. Cl.
*H04W 12/06* (2021.01)
*H04W 36/22* (2009.01)
(Continued)

(52) U.S. Cl.
CPC ........... *H04W 76/12* (2018.02); *H04M 7/009* (2013.01); *H04W 8/02* (2013.01); *H04W 8/04* (2013.01); *H04W 8/08* (2013.01); *H04W 40/20* (2013.01); *H04W 80/04* (2013.01); *H04W 80/10* (2013.01); *H04W 84/045* (2013.01);
(Continued)

(58) Field of Classification Search
CPC ..... H04W 36/22; H04W 76/022; H04W 8/04; H04W 84/045; H04W 40/20; H04W 88/02; H04W 12/08; H04W 12/06; H04M 7/009; H04M 7/00
See application file for complete search history.

(56) References Cited

U.S. PATENT DOCUMENTS

| 7,773,571 B1 | 8/2010 | Maxwell et al. |
| 7,990,912 B2 | 8/2011 | Nix, Jr. et al. |

(Continued)

*Primary Examiner* — Khawar Iqbal

(57) ABSTRACT

A method and apparatus of routing a call in a femtocell network are disclosed. In one example call routing method, a call is originated from the mobile station via a femtocell access point and the call is transmitted to a femtocell gateway, a mobile switching center and a carrier gateway server and onto an enterprise gateway server to obtain policy information. A routing policy is determined based on the obtained policy information and the call is routed to its destination based on the routing policy. The call may be routed via local media from a femtocell access point directly to the enterprise gateway server. The call routing procedures may implement the Iuh protocol and/or the session initiation protocol (SIP) for call signaling in the femtocell network. Call routing may be performed in a wireless cellular communications network or an enterprise network environment.

17 Claims, 20 Drawing Sheets

Related U.S. Application Data continuation of application No. 16/581,613, filed on Sep. 24, 2019, now Pat. No. 10,721,784, which is a continuation of application No. 15/895,123, filed on Feb. 13, 2018, now Pat. No. 10,425,978, which is a continuation of application No. 14/988,478, filed on Jan. 5, 2016, now Pat. No. 9,894,696, which is a continuation of application No. 14/314,763, filed on Jun. 25, 2014, now Pat. No. 9,232,459, which is a continuation of application No. 13/900,880, filed on May 23, 2013, now Pat. No. 8,768,367, which is a continuation of application No. 12/885,207, filed on Sep. 17, 2010, now Pat. No. 8,457,615.

(60) Provisional application No. 61/243,491, filed on Sep. 17, 2009.

(51) Int. Cl.

| | | |
|---|---|---|
| *H04W 76/12* | (2018.01) | |
| *H04W 8/04* | (2009.01) | |
| *H04W 8/08* | (2009.01) | |
| *H04W 40/20* | (2009.01) | |
| *H04W 8/02* | (2009.01) | |
| *H04M 7/00* | (2006.01) | |
| *H04W 84/04* | (2009.01) | |
| *H04W 80/04* | (2009.01) | |
| *H04W 80/10* | (2009.01) | |
| *H04W 88/02* | (2009.01) | |
| *H04W 88/14* | (2009.01) | |
| *H04W 88/16* | (2009.01) | |

(52) U.S. Cl.
CPC ............ *H04W 88/02* (2013.01); *H04W 88/14* (2013.01); *H04W 88/16* (2013.01)

(56) References Cited

U.S. PATENT DOCUMENTS

| | | | |
|---|---|---|---|
| 8,208,931 B2 * | 6/2012 | Gupta | H04L 65/1053 |
| | | | 455/445 |
| 8,271,024 B1 | 9/2012 | Sylvain et al. | |
| 8,335,503 B1 | 12/2012 | Desmond et al. | |
| 8,719,420 B2 | 5/2014 | Huber et al. | |
| 8,775,674 B2 | 7/2014 | Poulson et al. | |
| 8,787,342 B2 | 7/2014 | Huber et al. | |
| 8,831,014 B2 | 9/2014 | Koodli et al. | |
| 9,084,271 B2 | 7/2015 | Jo et al. | |
| 9,300,699 B2 | 3/2016 | Kung et al. | |
| 9,379,909 B2 | 6/2016 | Lee et al. | |
| 9,380,506 B2 | 6/2016 | Silver et al. | |
| 9,756,137 B2 | 9/2017 | Schneider et al. | |
| 2002/0111176 A1 | 8/2002 | Roeder | |
| 2006/0025139 A1 | 2/2006 | Bales et al. | |
| 2006/0079228 A1 | 4/2006 | Marsico et al. | |
| 2007/0070976 A1 | 3/2007 | Mussman et al. | |
| 2007/0206563 A1 | 9/2007 | Silver et al. | |
| 2007/0206568 A1 | 9/2007 | Silver et al. | |
| 2007/0206569 A1 | 9/2007 | Silver et al. | |
| 2007/0217594 A1 | 9/2007 | Giacometto et al. | |
| 2007/0280162 A1 | 12/2007 | Deshpande et al. | |
| 2008/0132239 A1 | 6/2008 | Khetawat et al. | |
| 2008/0244148 A1 | 10/2008 | Nix, Jr. et al. | |
| 2009/0061873 A1 * | 3/2009 | Bao | H04W 36/22 |
| | | | 455/436 |
| 2009/0067417 A1 * | 3/2009 | Kalavade | H04W 88/16 |
| | | | 370/356 |
| 2009/0093252 A1 | 4/2009 | Czaja et al. | |
| 2009/0131016 A1 | 5/2009 | Osborn | |
| 2009/0156213 A1 | 6/2009 | Spinelli et al. | |
| 2009/0170519 A1 | 7/2009 | Wilhoite et al. | |
| 2009/0286540 A1 * | 11/2009 | Huber | G06Q 20/322 |
| | | | 455/445 |
| 2009/0310582 A1 | 12/2009 | Beser | |
| 2010/0008259 A1 | 1/2010 | Yoon et al. | |
| 2010/0041365 A1 * | 2/2010 | Lott | H04W 60/00 |
| | | | 455/406 |
| 2010/0056144 A1 | 3/2010 | Gallagher et al. | |
| 2010/0075692 A1 * | 3/2010 | Busschbach | H04L 47/10 |
| | | | 455/445 |
| 2010/0098057 A1 | 4/2010 | Stewart | |
| 2010/0130170 A1 | 5/2010 | Liu et al. | |
| 2010/0197309 A1 | 8/2010 | Fang et al. | |
| 2010/0197311 A1 * | 8/2010 | Walldeen | H04W 36/0055 |
| | | | 455/444 |
| 2010/0291897 A1 * | 11/2010 | Ghai | H04L 63/0272 |
| | | | 455/410 |
| 2010/0311416 A1 | 12/2010 | Abichandani et al. | |
| 2011/0021196 A1 | 1/2011 | Grayson et al. | |
| 2011/0080899 A1 | 4/2011 | Delker et al. | |
| 2011/0211531 A1 | 9/2011 | Woodson et al. | |
| 2011/0243097 A1 | 10/2011 | Lindqvist et al. | |
| 2011/0244870 A1 | 10/2011 | Lee | |
| 2012/0100861 A1 | 4/2012 | Zhang et al. | |
| 2012/0178425 A1 | 7/2012 | Gisby et al. | |
| 2012/0190374 A1 | 7/2012 | Jo et al. | |
| 2012/0244830 A1 * | 9/2012 | Bao | H04W 36/22 |
| | | | 455/438 |
| 2014/0329531 A1 | 11/2014 | Liu et al. | |
| 2014/0335854 A1 | 11/2014 | LaBauve et al. | |
| 2015/0289138 A1 * | 10/2015 | Wang | H04W 12/08 |
| | | | 455/411 |
| 2016/0066221 A1 * | 3/2016 | Sapkota | H04W 36/36 |
| | | | 455/436 |
| 2016/0165515 A1 | 6/2016 | Parsons et al. | |
| 2016/0183156 A1 | 6/2016 | Chin et al. | |
| 2016/0269871 A1 | 9/2016 | Huber et al. | |
| 2016/0381725 A1 * | 12/2016 | Spinelli | H04W 92/02 |
| | | | 370/329 |
| 2017/0214622 A1 * | 7/2017 | Liu | H04W 40/02 |

* cited by examiner (OVERVIEW)

(LOCATION UPDATE)

(MOBILE ORIGINATION –
ROUTE VIA ENTERPRISE)

(MOBILE ORIGINATION – ROUTE DIRECT)

FIG. 5 (DESK TOP TERMINATION)

FIG. 6 (MOBILE TERMINATION)

FIG. 7 (LOCATION UPDATE)

(MOBILE ORIGINATION –
ROUTE VIA ENTERPRISE)

(MOBILE ORIGINATION – ROUTE DIRECT)

FIG. 10 (DESKTOP TERMINATION)

(LOCATION UPDATE SIP)

FIG. 12 (MOBILE ORIGINATION – ROUTE VIA ENTERPRISE - SIP)

(MOBILE ORIGINATION – ROUTE DIRECT - SIP)

(DESKTOP TERMINATION - SIP)

METHOD AND APPARATUS OF SUPPORTING WIRELESS FEMTOCELL COMMUNICATIONS

TECHNICAL FIELD OF THE INVENTION

This invention relates to a method and apparatus of supporting various network communications in a femtocell network environment, and, more specifically, to supporting calls, data transfers and other communication signaling initiated by a mobile station or other communication device.

BACKGROUND OF THE INVENTION

Cellular systems are widely deployed by wireless carriers over a wide geographic area. Various techniques are used for covering hard-to-reach places, for example, repeats, cell-splits etc. These techniques are often unable to provide sufficient coverage to local communication devices.

Femtocells may be deployed to provide licensed spectrum cellular systems within tightly constrained geographic areas. Femtocells normally cover a space as small as a room within a building, a small home and/or a business location. Femtocells are typically designed to provide service areas of 100-1000 square meters, while macrocells normally cover areas on the order of 10-100 square kilometers, and microcells cover 1-10 square kilometers, and picocells cover 10,000-100,000 square meters.

Licensed-spectrum femtocells are usually designed to utilize a similar air-interface as an external macro-cell network so that the vast majority of devices can be used without any change. Femtocells operate according to a typical base-station-to-handset infrastructure.

Femtocell network deployments are not significantly structured or preplanned. Rather, these networks often comprise a plurality of ad-hoc femtocell deployments. The simple femtocell configuration allows the femtocell networks to adapt to meet the requirements of many different deployment environments. For example, some networks might scale to one million femtocells, any of which might enter or leave the network at any time.

In some networks, a femtocell network operator, such as, a business owner, might operate an entire network of femtocells for a selected group. For example, an office building might deploy a femtocell network to provide mobile telephone access to the employees. In these environments, many businesses might desire to forgo the use of typical landline phones or VOIP phones in favor of a mobile Internet business telephone network that allows their employees to use their mobile devices as replacements for expensive phone lines and Internet services. However, to replace a landline or VOIP system, a private branch exchange (PBX) that provides support for VOIP and/or landline PBXs is typically desired. However, because of the dynamic nature of a femtocell network it is challenging to integrate different network communication infrastructures, such as, VOIP communications, PBX communications, mobile station to landline and vice-versa, etc. Specific signaling and procedural guidelines must be adhered to when integrating communication systems with femtocells.

SUMMARY OF THE INVENTION

One embodiment of the present invention may include a method of placing a call from a desktop phone to a mobile station. The method may include receiving an incoming call at a private branch exchange (PBX), the incoming call destined for a PBX desktop phone or associated mobile station, transmitting the call to an enterprise gateway server, determining a routing number and location of the mobile station and determining that the routing number and location information correspond to a cell site associated with a femtocell.

Another example embodiment may include routing a call from a mobile station. The method may include originating a call from the mobile station that is connected to a femtocell, forwarding the call to a mobile switching center (MSC), transmitting an origination trigger from the MSC, selecting a corresponding enterprise gateway server in which the mobile station has a policy subscription and sending a request to the enterprise gateway server for policy information that is required for processing the call.

Another example method may include routing a call from a mobile station. The method may further include originating a call from the mobile station operating in an enterprise network of a femtocell, transmitting an invite message to a femtocell gateway operating in a wireless communications network different from the enterprise network, transmitting an origination trigger from the femtocell gateway, selecting a corresponding enterprise gateway server in which the mobile station has a policy subscription and sending a request to the enterprise gateway server for policy information that is required for processing the call.

DETAILED DESCRIPTION OF THE INVENTION

Figure 1:
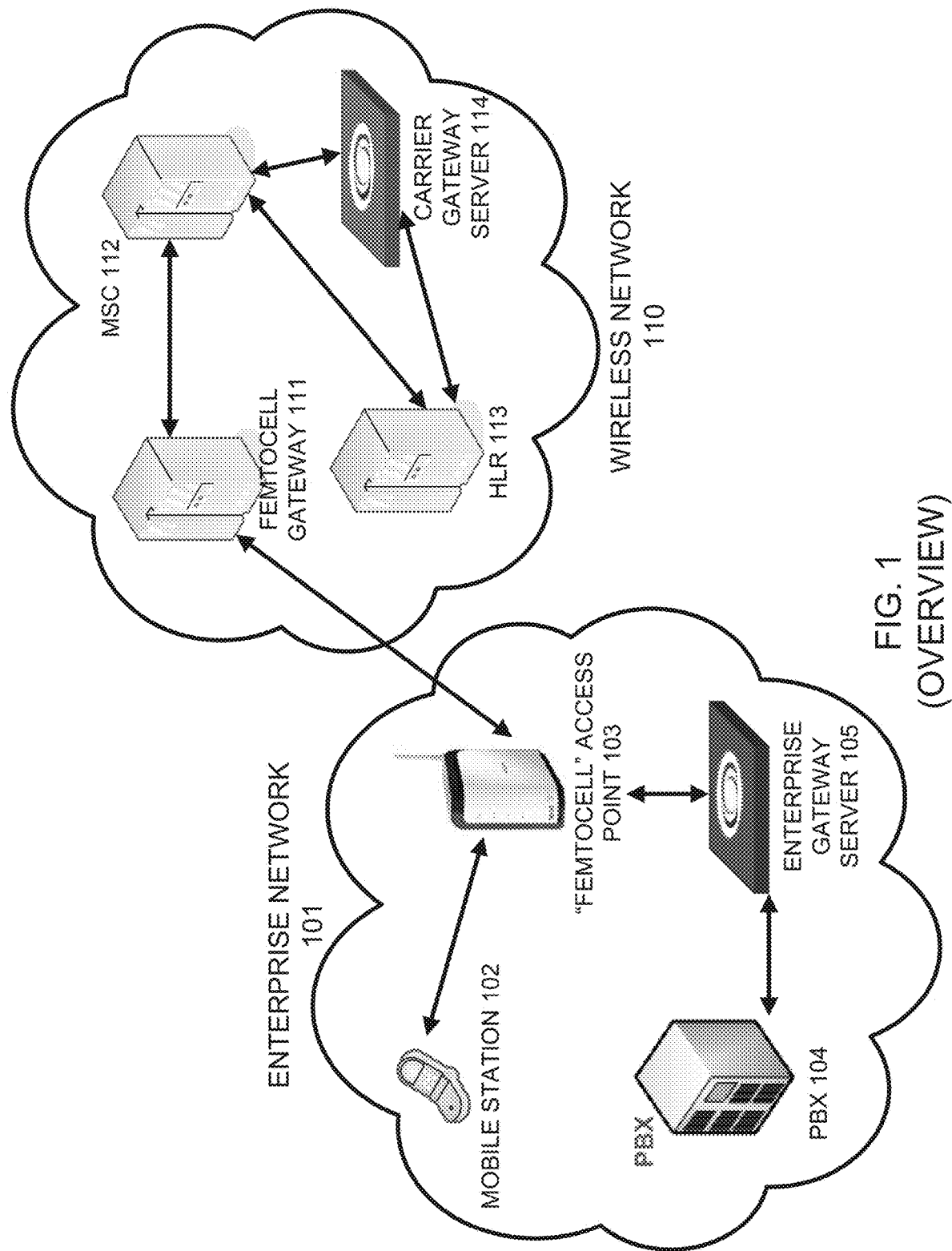
FIG. 1 illustrates an example network configuration overview, according to example embodiments of the present invention.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Data network communications provide users with access to various means of communications (e.g., Internet, voice, data, etc.). The capability to support femtocells in an enterprise networking environment provides wireless coverage for users working in buildings. If femtocells are further enhanced to support the local media routing of calls, such a configuration can benefit the enterprise and the carrier (i.e., service provider, network operator, etc.) by limiting the amount of traffic that is routed between the enterprise (home, business, etc.) and the wireless core network (mobile provider network).

Such a network configuration is particularly useful for calls between two mobile stations connected to a femtocell, or when a mobile station connected to the femtocell is participating in a call with a destination that would ultimately be routed into the enterprise network via the carrier network. For example, a mobile station call to a private branch exchange-unified communications (PBX/UC) extension, or, a mobile call to an international destination that would be routed through the enterprise PBX or unified communications (UC) system).

Local media routing may include utilizing local IP access capabilities of the PBX/UC to route information within the enterprise domain. Other examples of local media routing may include leveraging the authentication capabilities of the wireless network to provide authorized access to a femtocell enterprise gateway located in the enterprise domain. Closed user groups (CUG), as defined by the 3GPP standard, may be used to identify groups of users that are eligible for local PBX/UC access. Another example of leveraging the authentication capabilities of a wireless network may include, leveraging existing mobile phones currently supported on a macrocellular network (i.e., no specialized mobile phone is required to keep media local).

As described in detail below with reference to the accompanying drawings, the following figures illustrate networks and communication infrastructures that support methods of connecting a cellular phone or mobile station operating on a public mobile (wireless) network to an enterprise network.

FIG. 1 illustrates an example overview network, according to example embodiments of the present invention. Referring to FIG. 1, the wireless network 110 may include a carrier gateway server 114 that provides cellular telecommunication services to cellular phones, such as, mobile station 102. The wireless network 110 may also include a mobile switching center 112, a home location register 113 and other cellular components. The wireless network may also include a femtocell access point 103, which can also be denoted as a Home Node B specifically in the case of 3GPP, that integrates the femtocell communications between the mobile station networking components. The enterprise network may include the mobile station 102, which is connected to the wireless network, and which also communicates through the femtocell access point 103. The PBX or unified communications (UC) platform 104 is also an inherent part of most enterprise networks to provide support to landline telephones, internet telephony clients, and other local communication devices.

The enterprise gateway server 105 in the enterprise network 101 may be coupled with the carrier gateway server 114 via a communications link which may utilize a communications protocol such as session initiation protocol (SIP). The enterprise gateway server 105 may be considered a "femtocell gateway" or "enterprise femtocell gateway" or "femtocell enterprise gateway."

Figure 2:
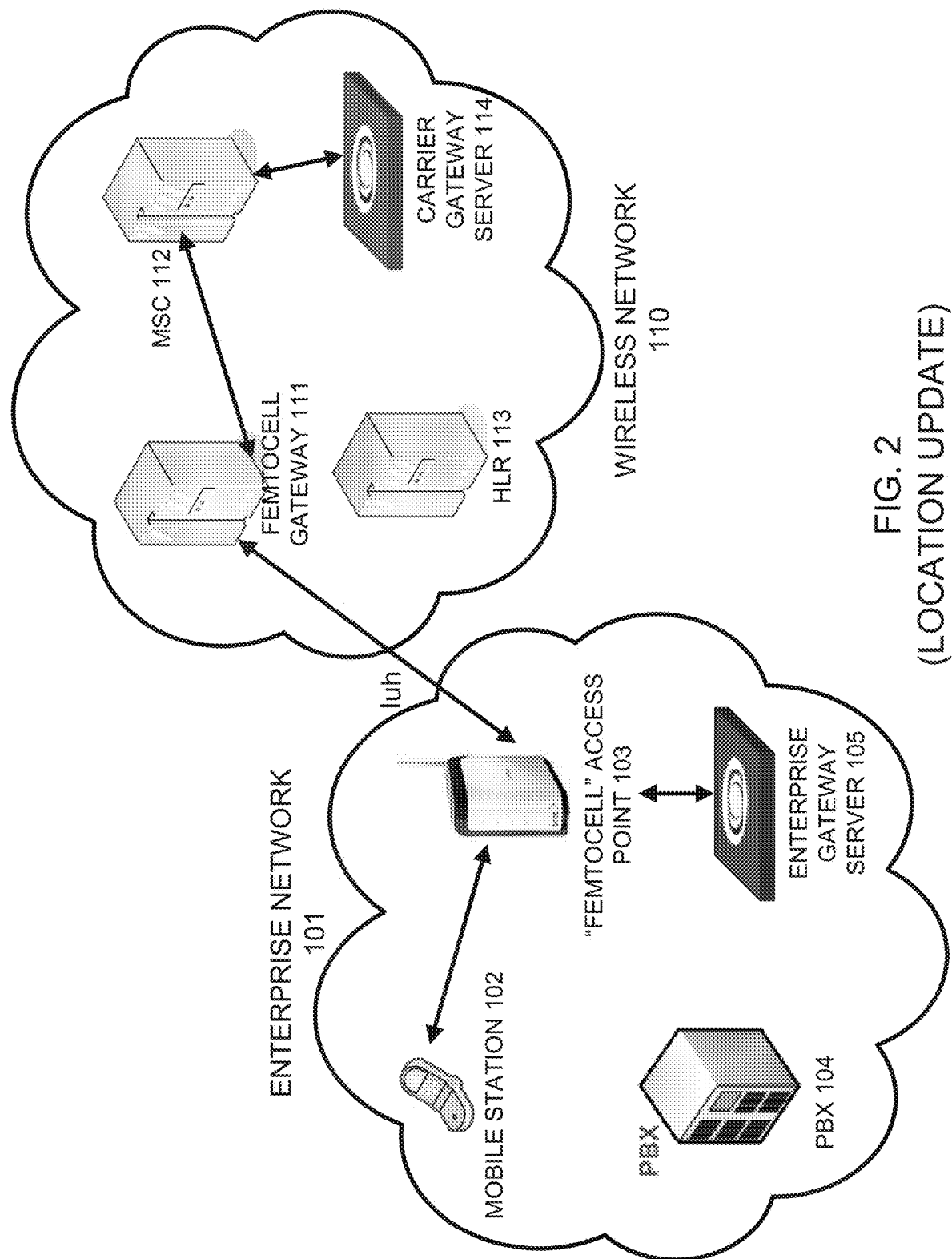
FIG. 2 illustrates an example network configuration performing a location update, according to example embodiments of the present invention.
Figure 3:
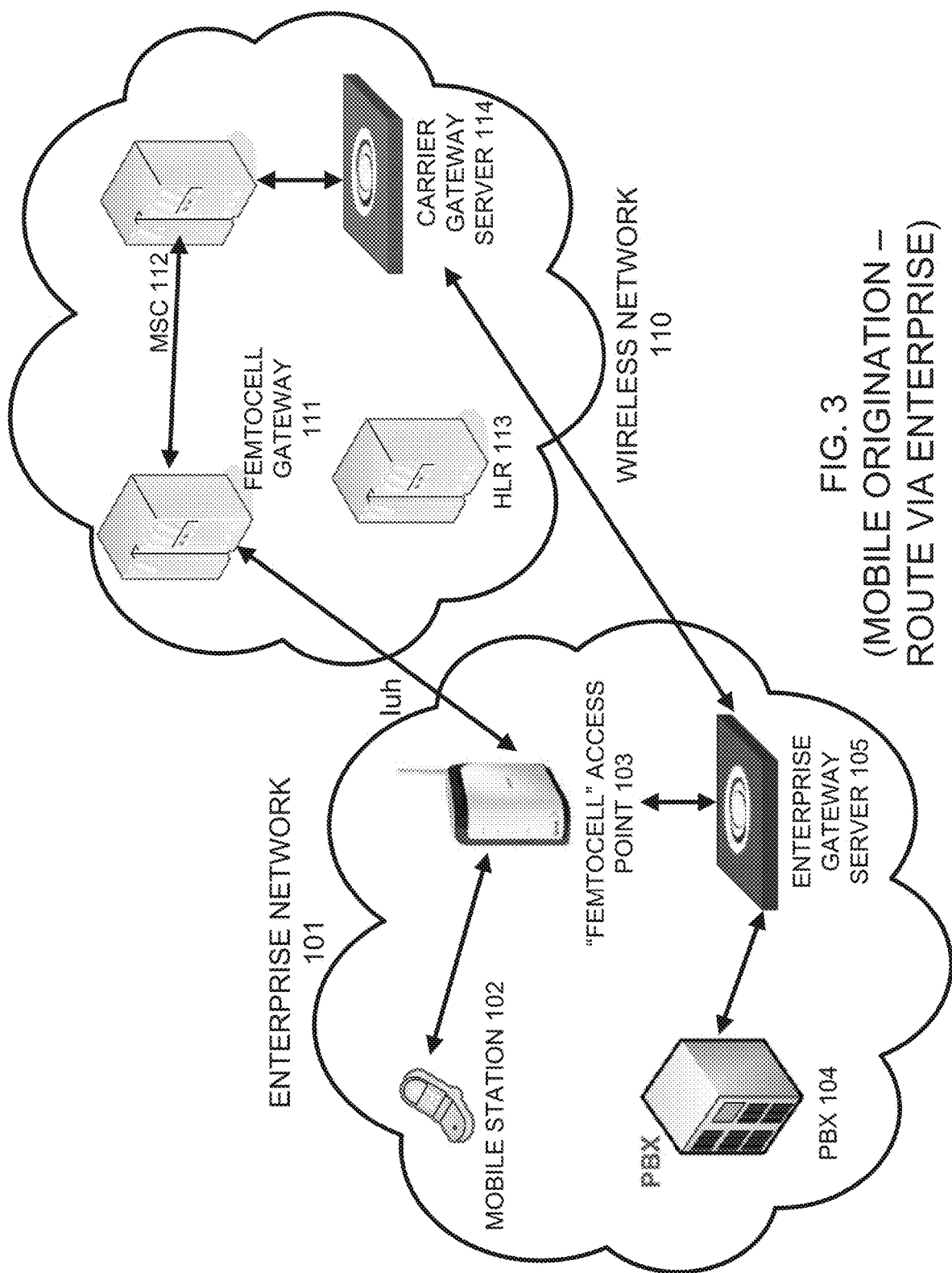
FIG. 3 illustrates an example network configuration that performs mobile origination via the enterprise network, according to example embodiments of the present invention.

FIG. 2 illustrates an example location update procedure network configuration, according to example embodiments of the present invention. Referring to FIG. 2, a mobile station 102 enters an area of femtocell coverage. The mobile station 102 attempts to register and subsequently update its location in the mobile network. The mobile station 102 sends a location update request to the femtocell access point 103 which sends the location update request to the femtocell gateway 111 which sends the location update request to the MSC 112 which updates the location information in the HLR 113, and responds back to confirm the location update to the MSC 112, to the femtocell gateway 111 to the femtocell access point 103 which then updates the enterprise gateway server 105 with the location information. FIG. 3 illustrates an example mobile origination route through the enterprise network, according to example embodiments of the present invention. According to FIG. 3, when the mobile station 102 is operating within the femtocell of the enterprise domain and originates a call, the policy decision may be to route the call locally within the enterprise network 101. The procedure for routing the call may include either recognizing the subscriber as part of the closed subscriber group (CSG) for the enterprise, or, when the femtocell is configured to allow any subscriber to utilize the femtocell, then sending the call to the enterprise gateway server 105. Such a configuration may include a SIP interface between the femtocell access point 103 and the enterprise gateway server 105.

Continuing with the mobile call origination procedure of the mobile station 102, the enterprise gateway server 105 may perform a lookup operation to determine a policy, validate the call conditions and determines if the call should be routed over the enterprise network 101 to its endpoint destination, or allow the call to be routed via a macro network. The decision as to how to route the call may depend on various factors, for example, the destination of the call, the time of day, the costs of routing, utilization of the PBX/UC features, etc.

In the case where the decision is to route the call to the PBX/UC 104, the enterprise gateway server 105 transmits the call to the PBX/UC 104 as if the call is coming from the user's personal desk phone. The call remains local, no resources are impacted in the mobile core network. The enterprise gateway server 105 holds billing records for the call which can be provided to the MSC 112 or other billing systems if required. Voice call continuity (VCC) methods for handing-off the enterprise femtocell call to the macrocellular network can be utilized if the mobile station 102 needs to handoff to/from the cellular network. The enterprise gateway server 105 and/or the carrier gateway server 114 can be utilized to facilitate the VCC handover.

Figure 4:
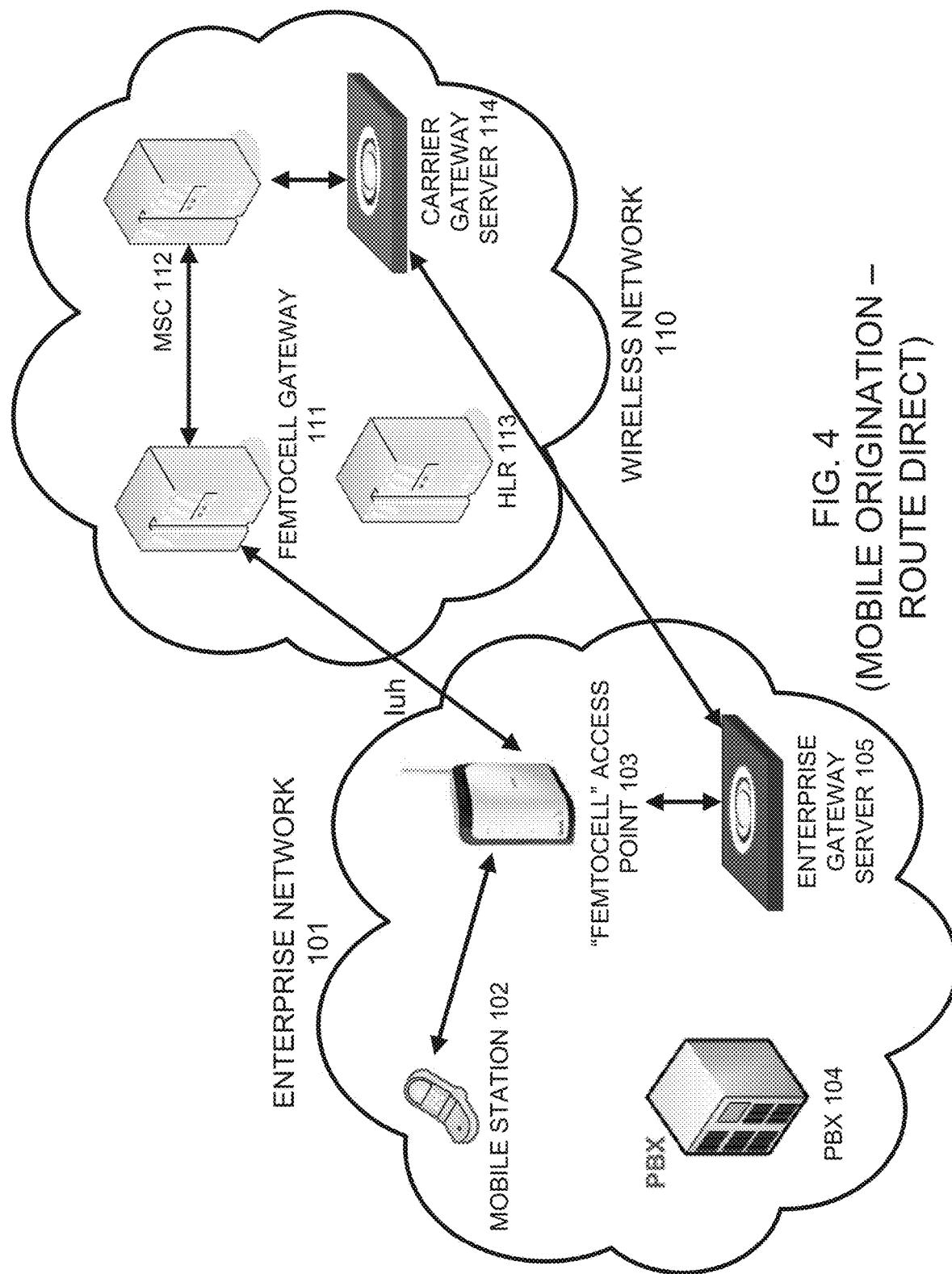
FIG. 4 illustrates an example network configuration that performs mobile origination via a direct route, according to example embodiments of the present invention.

FIG. 4 illustrates an example mobile origination direct route network configuration, according to example embodiments of the present invention. Referring to FIG. 4, mobile origination that is directly routed from the femtocell may include a procedure that supports a mobile station 102 utilizing a femtocell within an enterprise domain 101. In this example, the decision is made to route the call within the wireless network 110. This call routing procedure may include the femtocell either recognizing the subscriber 102 as part of the closed subscriber group (CSG) for the enterprise, or the femtocell is set to allow any subscriber to utilize the femtocell. The call is sent to the enterprise gateway server 105.

Continuing with FIG. 4, the enterprise gateway server 105 performs a policy look-up operation, validates the call conditions and determines if this call should be routed over the enterprise network to its endpoint, or if the call should be routed through the macronetwork. This decision may depend on various factors, for example, the destination of the call, time of day, costs of routing, utilization of PBX/UC 104 features, etc.

The enterprise gateway server 105 may then decide to route the call directly via the wireless network, and will inform the femtocell to proceed with routing the call as such. In the response from the enterprise gateway server 105 to the femtocell access point 103, the enterprise gateway server 105 may include the originally dialed destination or it may provide a modified destination including a short code provided as originally dialed digits, which may be converted to a fully qualified routable number. It is also possible that the enterprise gateway server 105 does not perform any modifications at this stage, and may commence changes after triggering is performed.

The femtocell access point 103 then routes the call to the femtocell gateway 111 which routes the call to the MSC 112 which may then send a trigger message to the carrier gateway server 114 which may then communicate with the enterprise gateway server 105, which responds to the carrier gateway server 114 that the call is intended to be routed directly via the carrier network and that call policy has already been invoked. It is also possible that the enterprise gateway server 105 may modify the destination by converting a short code provided as originally dialed digits to a fully qualified routable number. The carrier gateway server 114 responds to the MSC 112 with the indication to continue the call if no changes were made by the enterprise gateway server 105, or to route to the modified destination if the destination was changed.

Figure 5:
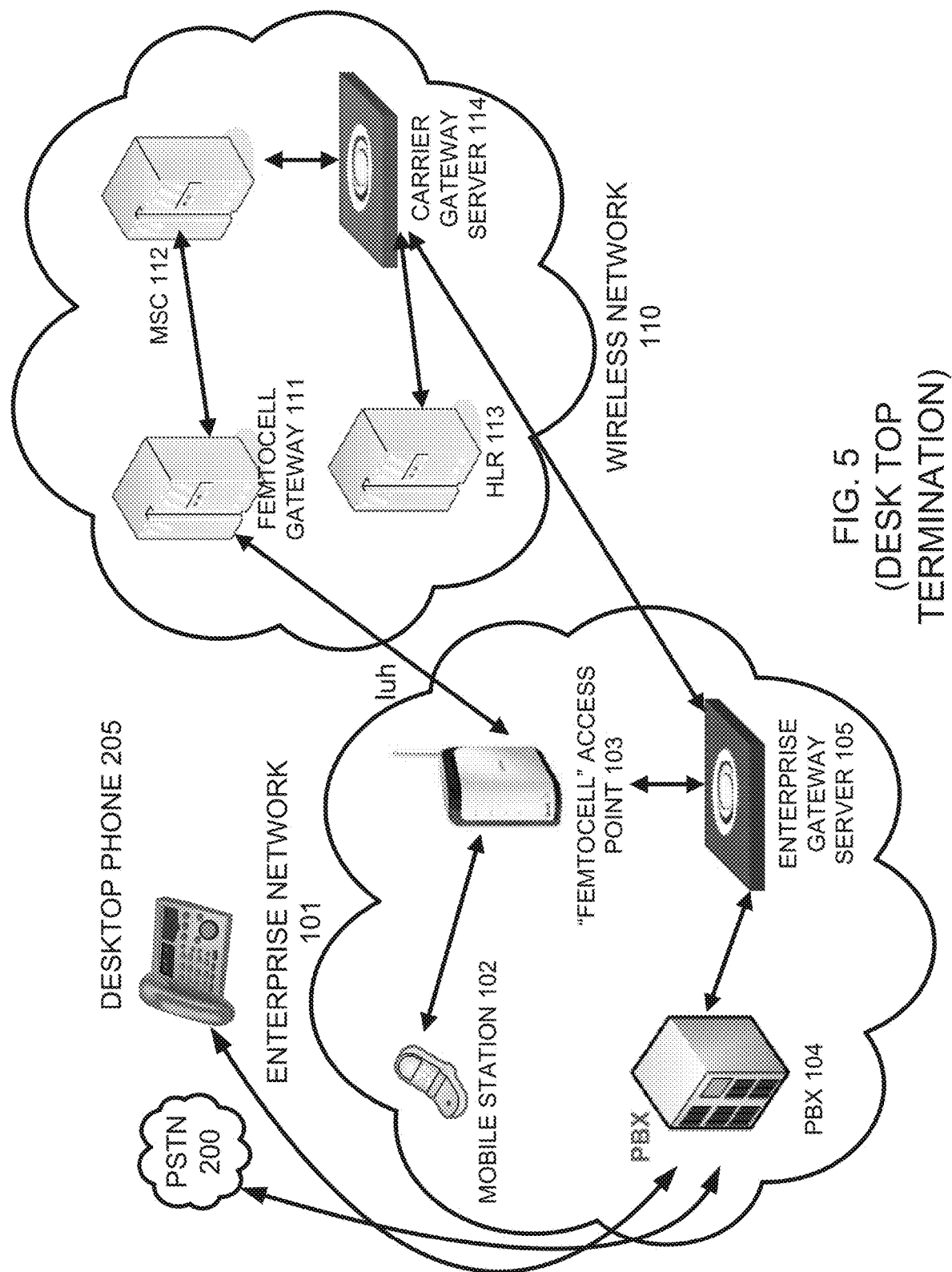
FIG. 5 illustrates a desktop termination example network configuration, according to example embodiments of the present invention.

FIG. 5 illustrates an example desk top termination procedure network configuration, according to example embodiments of the present invention. Referring to FIG. 5, a network configuration is illustrated that supports a procedure for maintaining medial local such that carrier network resources are not impacted. An incoming call from PSTN 200 is routed to the PBX 104 which extends a simultaneous ring "simring" leg to the mobile station 102 when the user's desk phone 205 is dialed. Example operations for this particular configuration may include enterprise gateway server 105 receiving a "simring" leg from the PBX/UC 104.

The enterprise gateway server 105 may already be aware that mobile station 102 is located on femtocell access point 103 from the previous location update procedure, or, alternatively the enterprise gateway server 105 may request location information from the carrier gateway server 114, which can perform an AnytimeInterrogation (ATI) procedure in the wireless network 110 to determine if the mobile station 102 is currently located on the femtocell.

If the mobile station 102 is located on the femtocell, enterprise gateway server 105 routes the call to the femtocell for delivery directly to the mobile station 102, while maintaining the media in the enterprise network. If the mobile station 102 is no longer within the femtocell coverage area, the femtocell will notify the enterprise gateway server 105, and the enterprise gateway server 105 will route the call to the carrier gateway server 114 and to the MSC 112. Subsequently, a media bearer path may be established between PBX 104 and MSC 112 either directly or via the enterprise gateway server 105 and through the PSTN 200 or other transport network.

Figure 6:
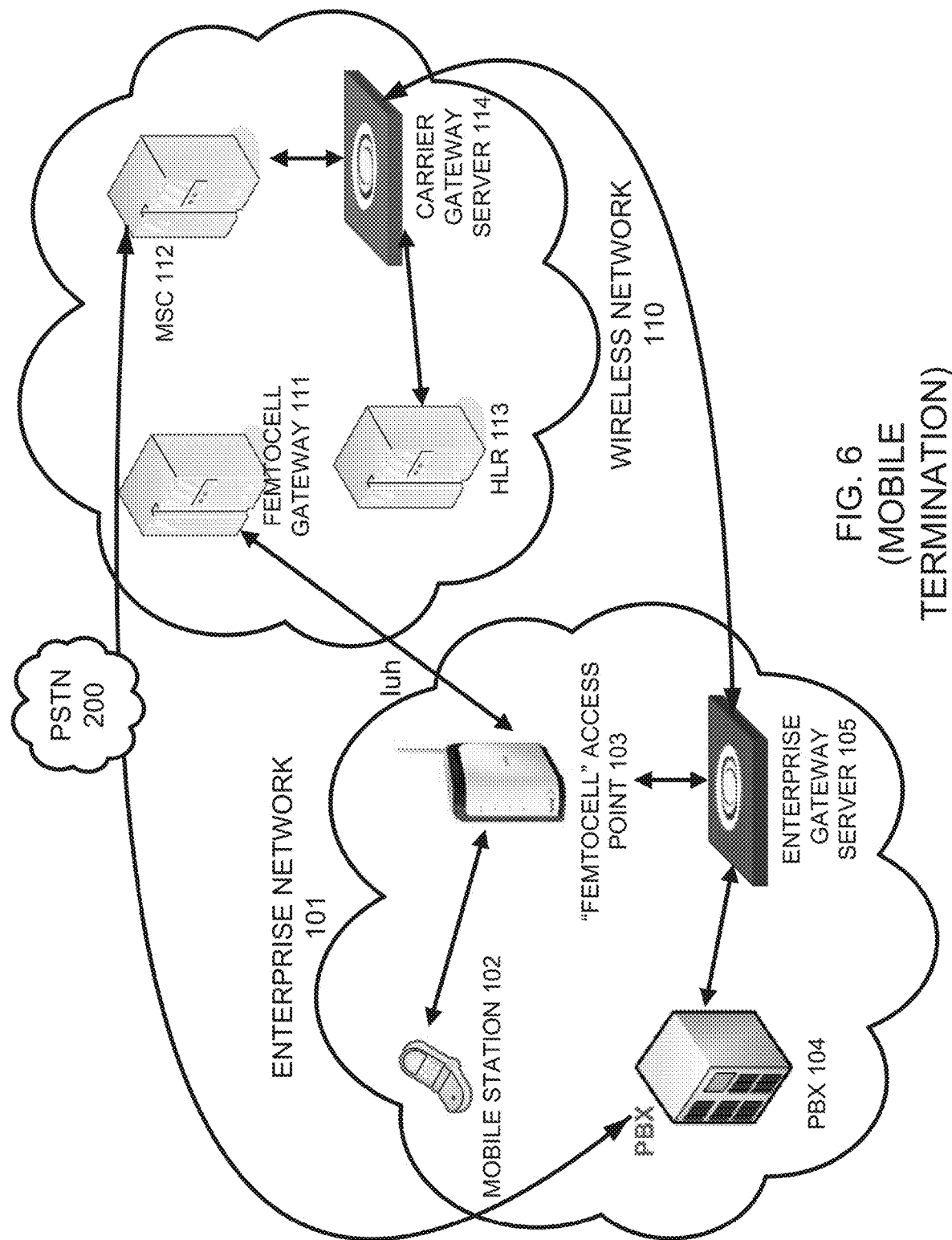
FIG. 6 illustrates a mobile termination network configuration, according to example embodiments of the present invention.

FIG. 6 illustrates an example mobile termination procedure network configuration, according to example embodiments of the present invention. Referring to FIG. 6, a network configuration is illustrated that outlines how the media may be handled when the call is delivered to the mobile number. This call procedure may include an inbound call that is received for the mobile station 102 at the MSC 112, which may be a gateway mobile switching center (GMSC). The incoming call may be delivered through the PSTN 200. The carrier gateway server 114 receives a termination trigger from the MSC 112, and sends a request for policy to the enterprise gateway server 105 with the call information from the trigger event. Using this call information, the enterprise gateway server 105 assesses if the mobile station 102 is operating on the femtocell network and determines the routing policy, which is returned to the carrier gateway server 114 and onto the MSC 112 for routing of the call. This may include a pilot number to route the call from MSC 112 to the PBX 104.

Continuing with FIG. 6, if the mobile station 102 is registered on the femtocell, then the enterprise gateway server 105 returns a pilot number to the carrier gateway server 114 and the MSC 112 which routes the call to the pilot number destined for PBX 104. The call is then routed from PBX 104 to the enterprise gateway server 105 which routes the call to the femtocell access point 103 to provide local media routing. If the mobile station 102 is no longer within the femtocell coverage area, then the femtocell will notify the enterprise gateway server 105 and the enterprise gateway server 105 will route the call via the MSC 112 for call handling.

Certain alternative procedures for the call processing operations described so far may also include additional operations. For example, when utilizing an open and unrestricted femtocell that allows any mobile station to utilize the femtocell, and the femtocell utilizes the location update procedures as previously defined, then the enterprise femtocell gateway server 105 can enable the enterprise to control the members of the closed user group, which may be defined in the enterprise via the PBX 104, or, through the enterprise-controlled femtocell gateway server 105, or, instead, through a closed subscriber group that is allowed to use the femtocell.

In this example, the wireless network 110 does not need not be concerned with the definition or the provisioning of the CSGs for each enterprise in order to restrict its use only to users of that enterprise. In addition, this example involves providing the location update information from the femtocell to the enterprise gateway server 105 prior to sending the location information to the wireless network 110. If the enterprise gateway server 105 determines that the user is not a member of the CUG (i.e. they are not allowed to use the femtocell), then the enterprise gateway server 105 will prevent the wireless network 110 from receiving this location update, and the mobile station 102 will remain on the macronetwork.

An alternative to utilizing location updates from the femtocell access point 103 to the enterprise femtocell gateway server 105 is to instead have the enterprise gateway server 105 order the carrier gateway server 114 to perform an anytime interrogation (ATI) procedure in the wireless network. This operation will identify if the mobile station 102 is currently on the femtocell network and report back to the enterprise gateway server 105.

All of the above examples described with reference to FIGS. 1-6 may implement the Iuh protocol and/or the Iuh protocol stack, which supports the interface between a Home Node_B or femtocell access point and a Home Node_B femtocell gateway. These protocols are part of the 3GPP femtocell standards. Iuh reuses standard protocols from the 3GPP-defined UMTS standards, such as, RANAP and GTP-u while introducing some other protocols to meet the specific requirements of 3G femtocell deployments. FIGS. 7-11, which also illustrate example embodiments of the present invention, may implement an optimized set of Iuh protocol call flows.

Figure 7:
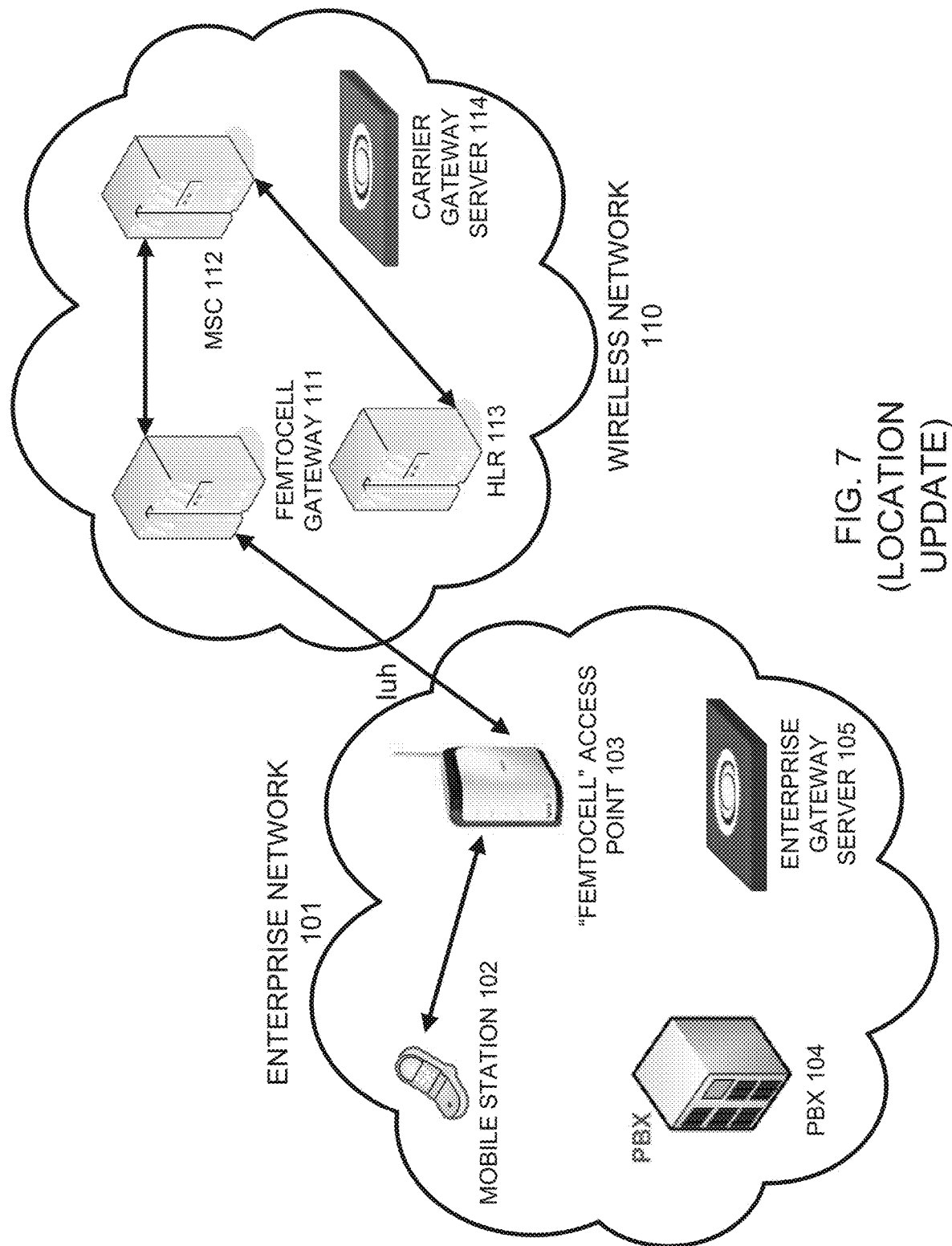
FIG. 7 illustrates a location update network configuration, according to example embodiments of the present invention.

FIG. 7 illustrates an example of a location update procedure network configuration, according to example embodiments of the present invention. Referring to FIG. 7, a location update procedure may include a call flow that begins with the mobile station 102 initiating the call flow operation by sending a message to the femtocell access point 103, which, in turn, communicates with the femtocell gateway 111 of the wireless network 110. The MSC 112 is notified of the location update of the mobile station 102 and the location information is stored in the home location register (HLR) 113.

Figure 8:
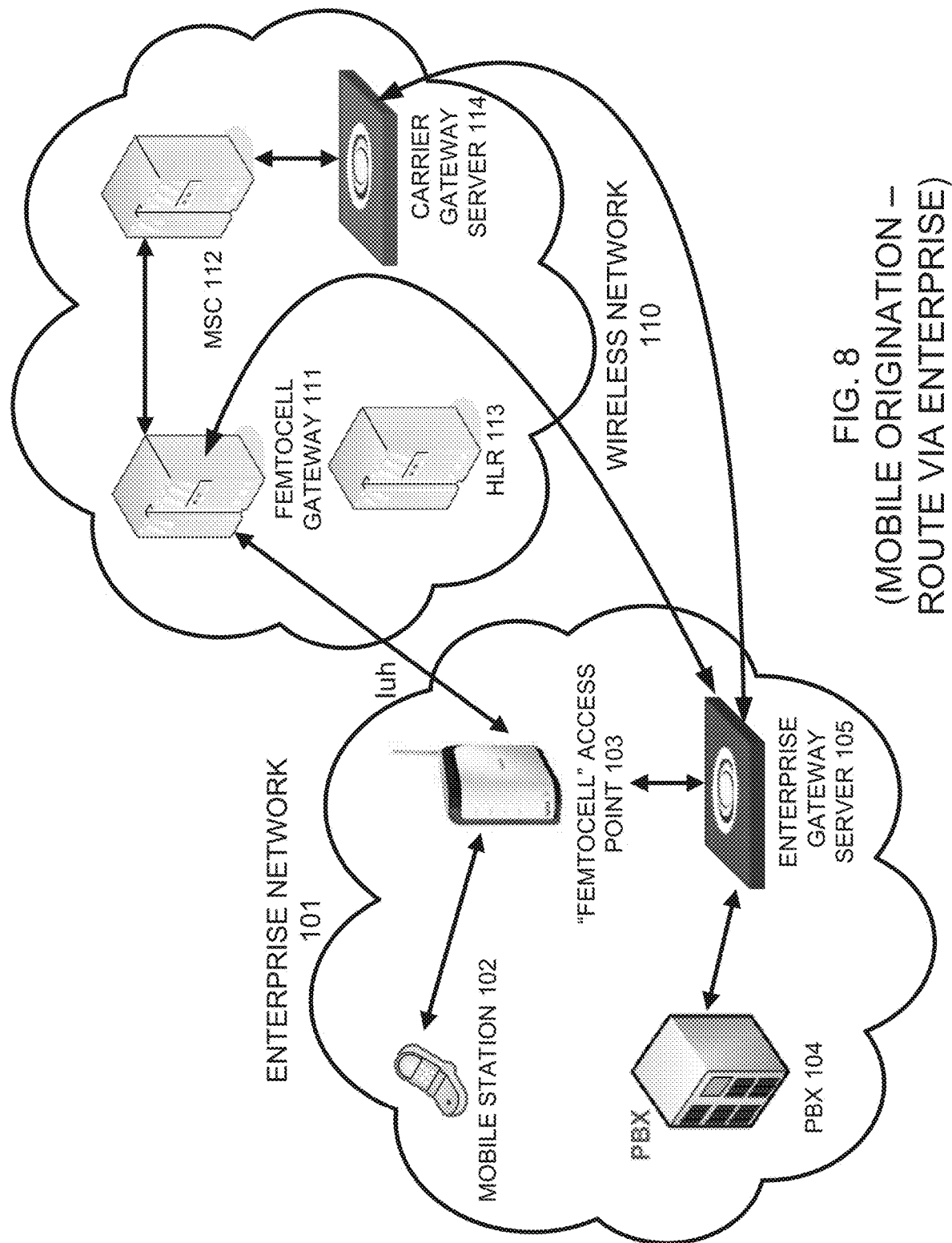
FIG. 8 illustrates mobile origination route via the enterprise network configuration, according to example embodiments of the present invention.

FIG. 8 illustrates an example of a mobile origination enterprise routed call procedure network configuration, according to example embodiments of the present invention. Referring to FIG. 8, a call is originated at the mobile station 102 and is sent to the femtocell access point 103, which forwards the call origination over a secure link to the femtocell gateway 111. The call is sent to the MSC 112 and an origination (INITDP2) trigger is sent to the carrier gateway server 114.

Next, the carrier gateway server 114 informs associated enterprise gateway server 105 of the mobile subscriber 112 of the call and trigger information such that the enterprise gateway server 105 can perform a policy decision procedure. The enterprise gateway server 105 contacts the femtocell gateway 111 to obtain the routing information for the femtocell access point 103. Based on the returned routing information, the enterprise gateway server 105 determines if it is able to communicate with the femtocell access point 103. If the enterprise gateway server 105 can communicate with the femtocell access point, the enterprise gateway server 105 may determine it may be advantageous to route the call using local media directly into the enterprise via the femtocell access point 103. The enterprise gateway server 105 contacts the femtocell gateway 111 to provide the routing information of the enterprise gateway server 105 including its IP address for the femtocell access point 103 to route to the enterprise gateway server 105, and to indicate to the femtocell gateway 111 that when it will receive an upcoming disconnection message from the MSC 112 that the femtocell gateway 111 should not disconnect the call for this user, but instead should order the femtocell access point 103 to redirect the call to the enterprise gateway server 105 on the network premises.

The enterprise gateway server 105 then responds to the carrier gateway server 114 with an order to disconnect the call, after which the carrier gateway server 114 will send a disconnect command to the serving MSC 112 which will send a disconnect command to the femtocell gateway 111. The femtocell gateway 111, having been provided the IP address of the enterprise gateway server 105 will send a redirect message, in response to the original invite, notifying the femtocell access point 103 to contact the enterprise gateway server 105 for call handling. The femtocell gateway 105 may then either release itself from the call, or maintain the call status until it should receive subsequent disconnection information from the enterprise gateway server 105 or a handout procedure occurs.

The femtocell access point 103, after being redirected, sends the invite to the enterprise gateway server 105 to set up the call and the enterprise gateway server 105 executes any policies and performs any translation/prefixing required and then sends the call invite to the PBX 104 to set up the call.

Figure 9:
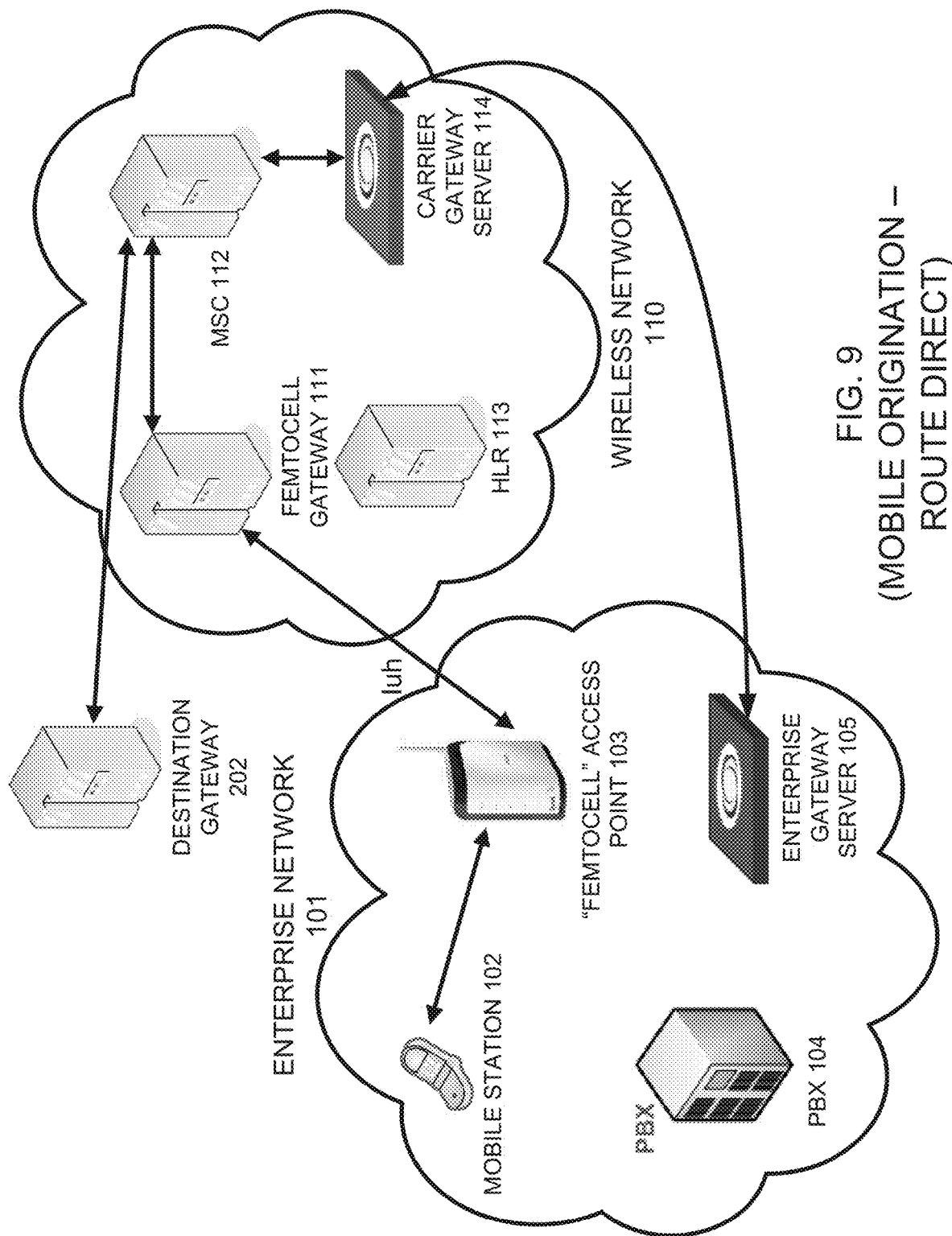
FIG. 9 illustrates a mobile origination route direct example network configuration, according to example embodiments of the present invention.

FIG. 9 illustrates an example of a mobile origination direct routed call procedure network configuration where the call is not routed into the enterprise, according to example embodiments of the present invention. Referring to FIG. 9, the mobile station 102 originates a call using the femtocell access point 103 and the femtocell access point 103 sends the call over a secure link to the femtocell gateway 111. The femtocell gateway 111 sends the call to the MSC 112, which sends an origination (INITDP2) trigger to the carrier gateway server 114. The carrier gateway server 114 then selects the correct enterprise gateway server 105 and sends a request to the enterprise gateway server 105 for the policy that should be applied to this call.

The enterprise gateway server 105 applies one or more policies to the call, and determines the call is supposed to be routed within the wireless network 110, and local media for this call will not be supported. The enterprise femtocell gateway server 105 indicates to the carrier gateway server 114 that the policy to be applied to this call is a direct route call policy type. The carrier gateway server 114 then sends a continue message to the serving MSC 112 to continue the call on the wireless network. The MSC 112 routes the call via a destination gateway 202 to its final destination.

Figure 10:
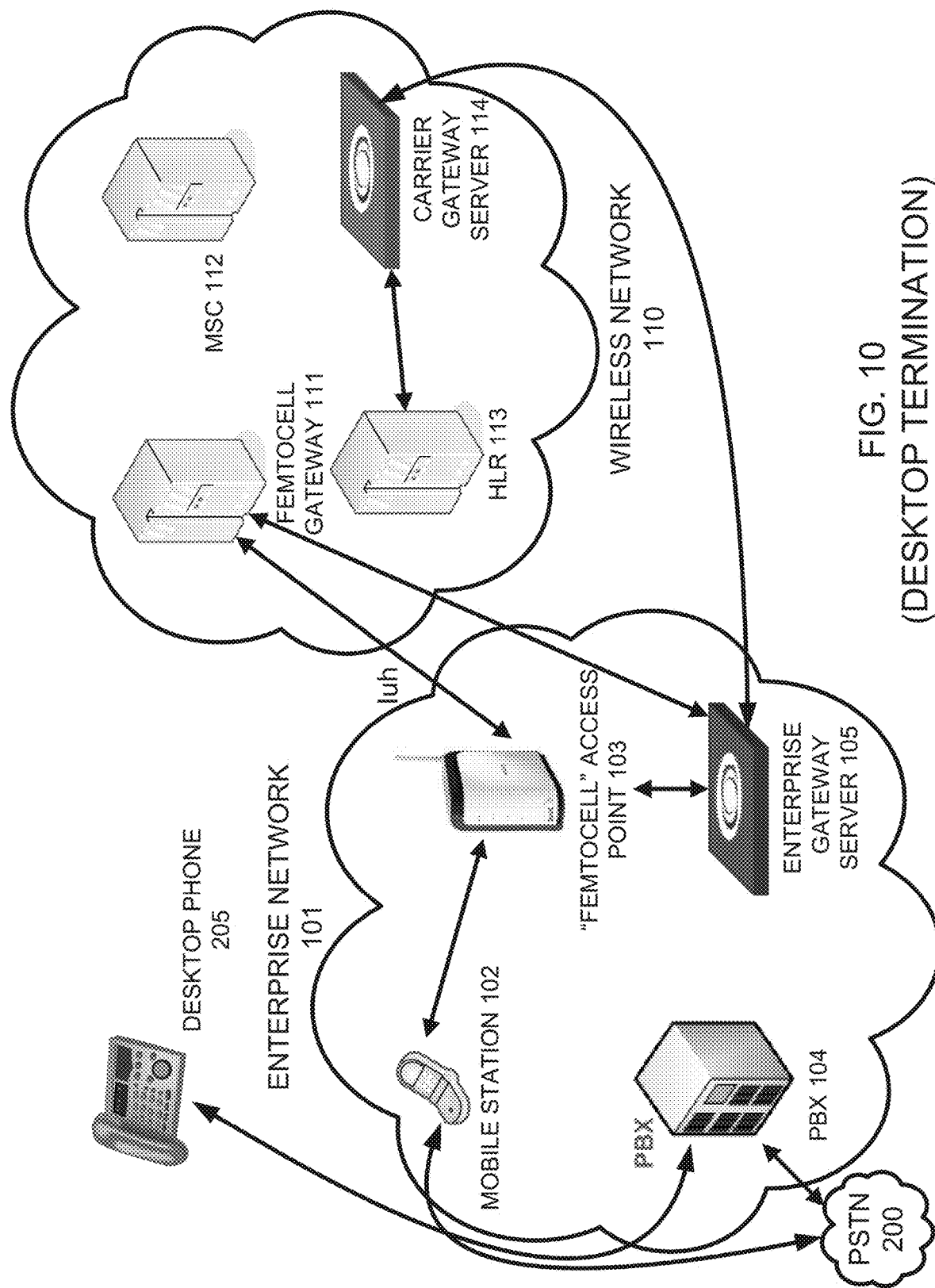
FIG. 10 illustrates a desktop termination network configuration, according to example embodiments of the present invention.

FIG. 10 illustrates an example of a desktop termination call procedure network configuration, according to example embodiments of the present invention. In this example, a call may arrive at the PBX 104 for a desktop phone 205. In addition to ringing the desktop phone 205, the PBX 104 may fork the call into the enterprise gateway server 105, which contacts the carrier gateway server 114 to obtain a routing number and location for the mobile station 102. The carrier gateway server 114 performs a location request by sending a message to the HLR 113 to obtain a routing number and the location of the mobile station 102. The HLR 113 requests a temporary routing number from the servicing MSC 112, which is returned to the carrier gateway server 114 in response to the routing request. The carrier gateway server 114 returns the routing number and the location information to the enterprise gateway server 105, which identifies that the location of the call is from a known cell site that is associated with a femtocell.

The enterprise gateway server 105 may then reference an internal table to determine if that femtocell is one that is supported by the enterprise network. This allows the enterprise network 101 to decide which public and/or private femtocells it may desire to allow its subscribers to utilize, or may enable the enterprise network 101 to specifically identify femtocells which cannot be accessed by the enterprise. If the femtocell is supported by the enterprise, the enterprise gateway server 105 sends a request to the femtocell gateway 111, which pages the mobile station 102 and returns an IP address to the enterprise gateway server 105 to contact the correct femtocell. The enterprise gateway server 105 sends an invite to the femtocell access point 103 to connect the mobile station 102 with the enterprise gateway server 105 via the femtocell access point 103.

Figure 11:
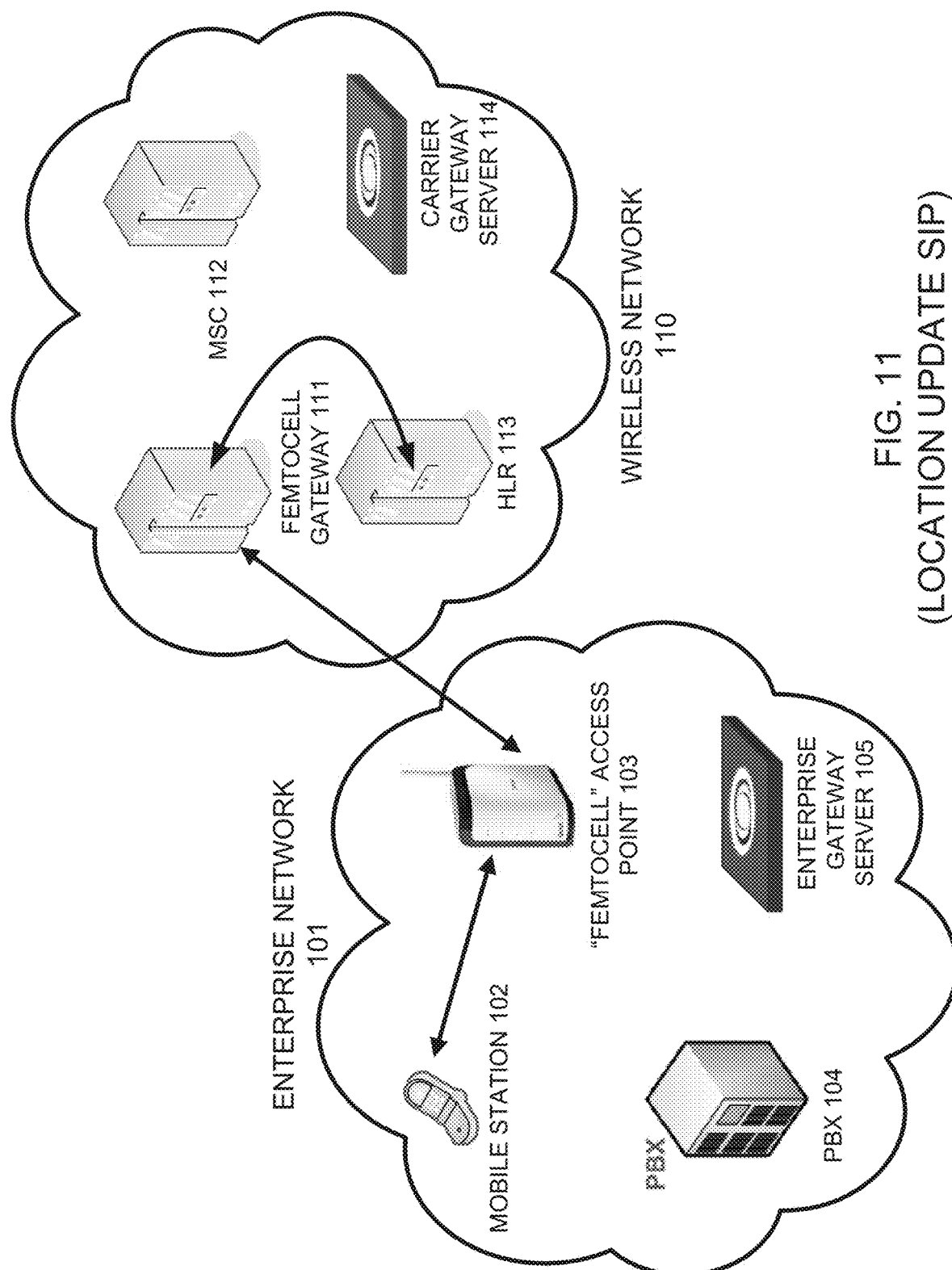
FIG. 11 illustrates an example location update network configuration, according to example embodiments of the present invention.

FIG. 11 illustrates an example of a location update procedure implementing session initiation protocol (SIP), according to example embodiments of the present invention. Referring to FIG. 11, a mobile station 102 transmits a location update message to the femtocell access point 103 which forwards a corresponding SIP REGISTER message to the femtocell gateway 111. The femtocell gateway 111 then forwards the location update information to the HLR 113.

Figure 12:
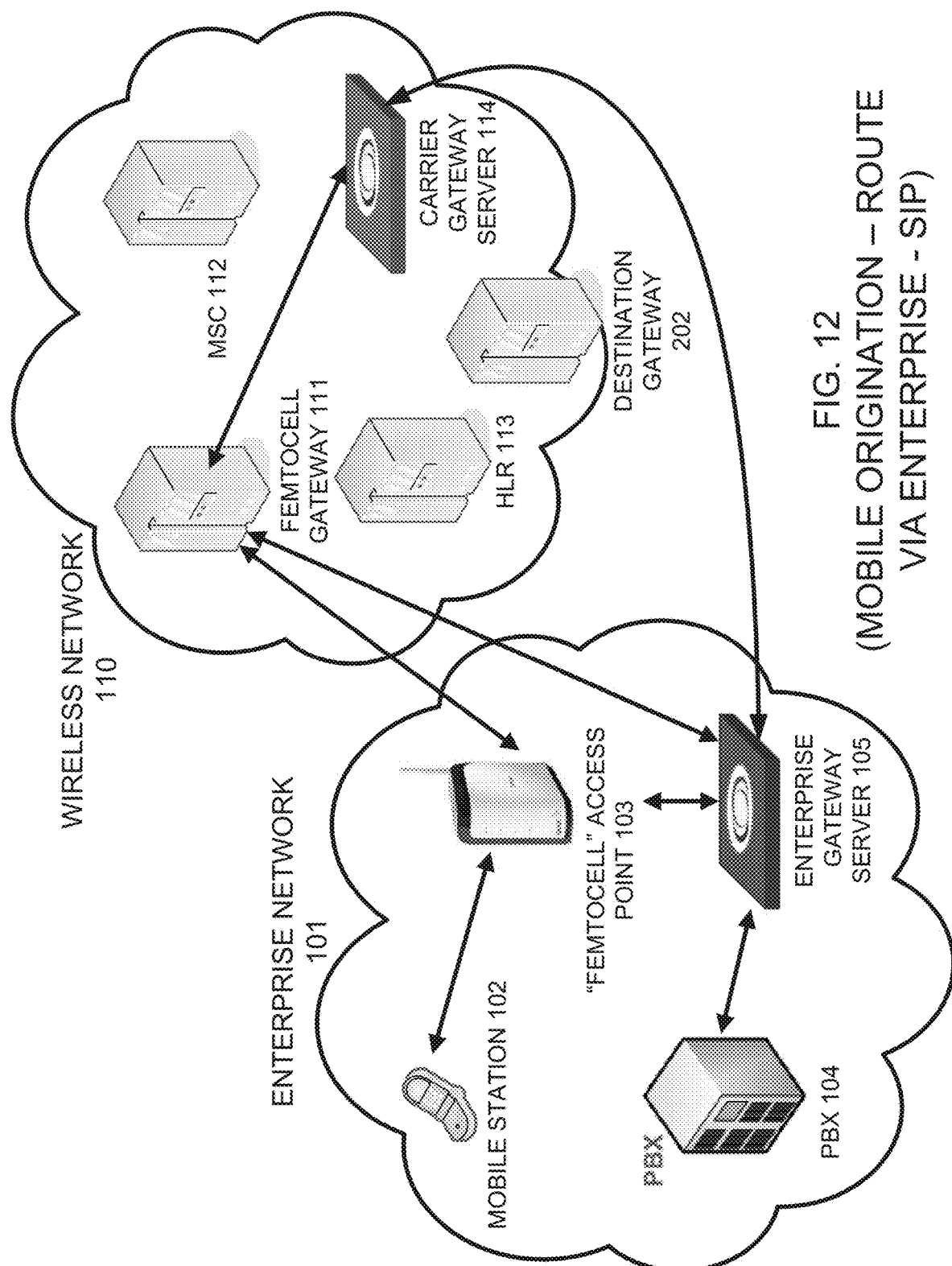
FIG. 12 illustrates a mobile origination route via the enterprise network configuration, according to example embodiments of the present invention.

FIG. 12 illustrates an example of a mobile origination route through the enterprise implementing session initiation protocol (SIP), according to example embodiments of the present invention. Referring to FIG. 12, a mobile station 102 transmits a mobile origination call to the femtocell access point 103, which forwards a SIP INVITE message to the femtocell gateway 111. An origination trigger is then forwarded to the carrier gateway server 114 which identifies and informs the corresponding enterprise gateway server 105, which performs a policy lookup with the information provided by the carrier gateway server 105. The enterprise gateway server 105 determines the mobile is on a femtocell and the policy is such that the call should be routed via the enterprise network.

The enterprise gateway server 105 forwards a request for a redirect IP address to the femtocell gateway 111, which is returned to the enterprise gateway server 105 which then responds to the carrier gateway server 114 with an order to disconnect the call with an indication of local media redirection designation. The carrier gateway server 114 then sends a disconnect message with the local media redirection designation to the femtocell gateway 111, which sends a redirection order for the call to the femtocell access point 103 and then proceeds with the disconnection procedure in the femtocell gateway 111. The femtocell access point 103 then sends an invite message to the enterprise gateway server 105 which sends the invite message to the femtocell gateway 111 to begin a new session for the existing call on the femtocell access point 103 such that the femtocell gateway 111 will be part of the signaling path in case a handover procedure is subsequently required. The femtocell gateway 111 responds to the enterprise gateway server 105, which then sends an invite message to the PBX with the desired originating and terminating information to route the call to the final destination via the PBX.

Figure 13:
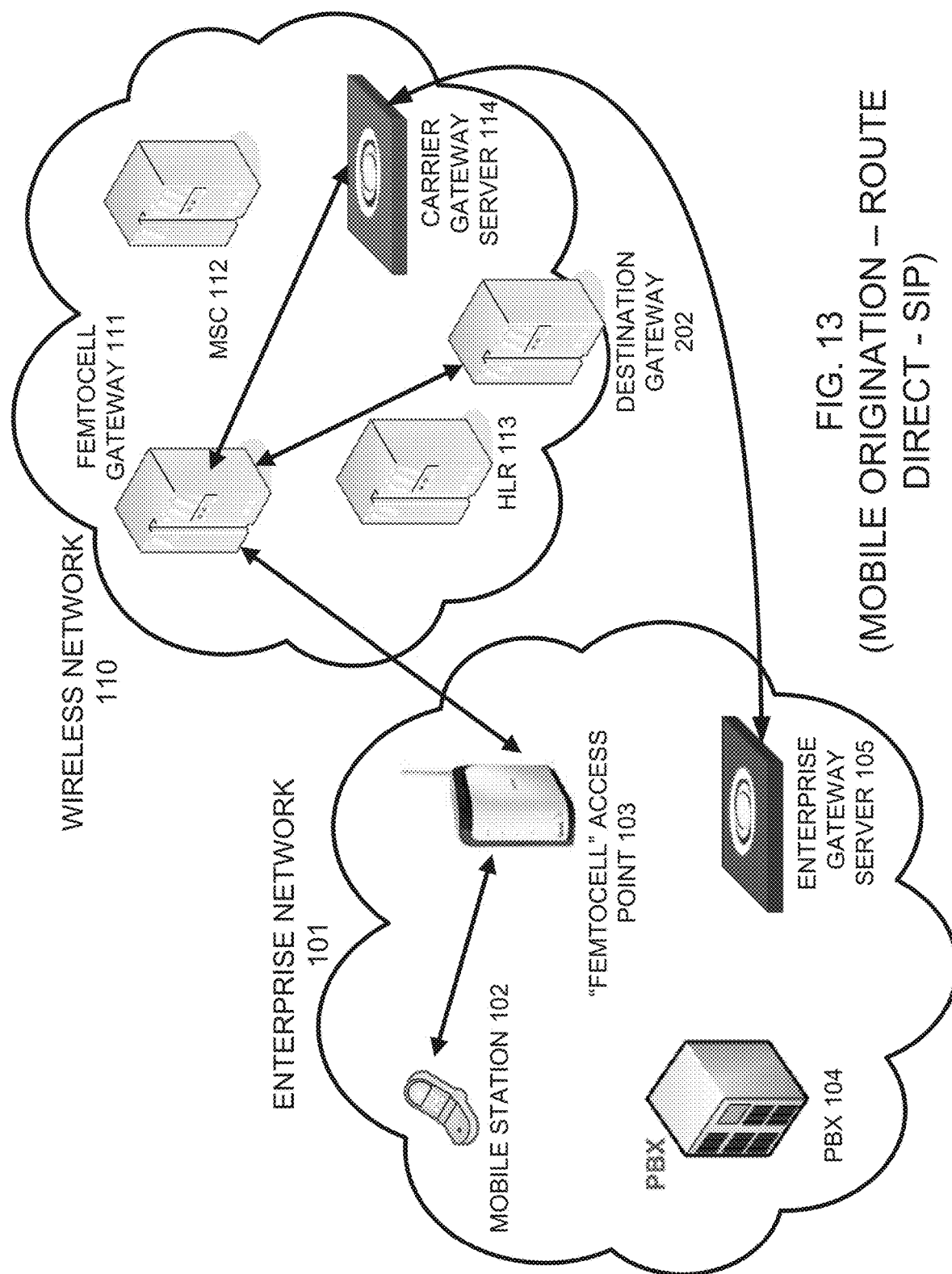
FIG. 13 illustrates a mobile origination direct route network configuration, according to example embodiments of the present invention.

FIG. 13 illustrates an example of a mobile origination direct route call procedure implementing session initiation protocol (SIP), according to example embodiments of the present invention. Referring to FIG. 13, a mobile station 102 originates a call to a femtocell access point 103, which, in turn forwards a SIP INVITE to the femtocell gateway 111. The femtocell gateway 111 sends an origination trigger to the carrier gateway server 114, which identifies and informs the corresponding enterprise gateway server 105, and which performs a policy lookup with the information provided by the carrier gateway server 105. The enterprise gateway server 105 determines the mobile station 102 is on a femtocell and that the policy is such that the call should be routed directly via the carrier network. The enterprise gateway server 105 responds to the carrier gateway server 114 with an order to proceed with routing the call in the carrier network. A continue message is sent to the femtocell gateway 111 from the carrier gateway server 114, which sends a SIP INVITE to the destination gateway 202, and the destination gateway 202 forwards the SIP INVITE to the final destination.

Figure 14:
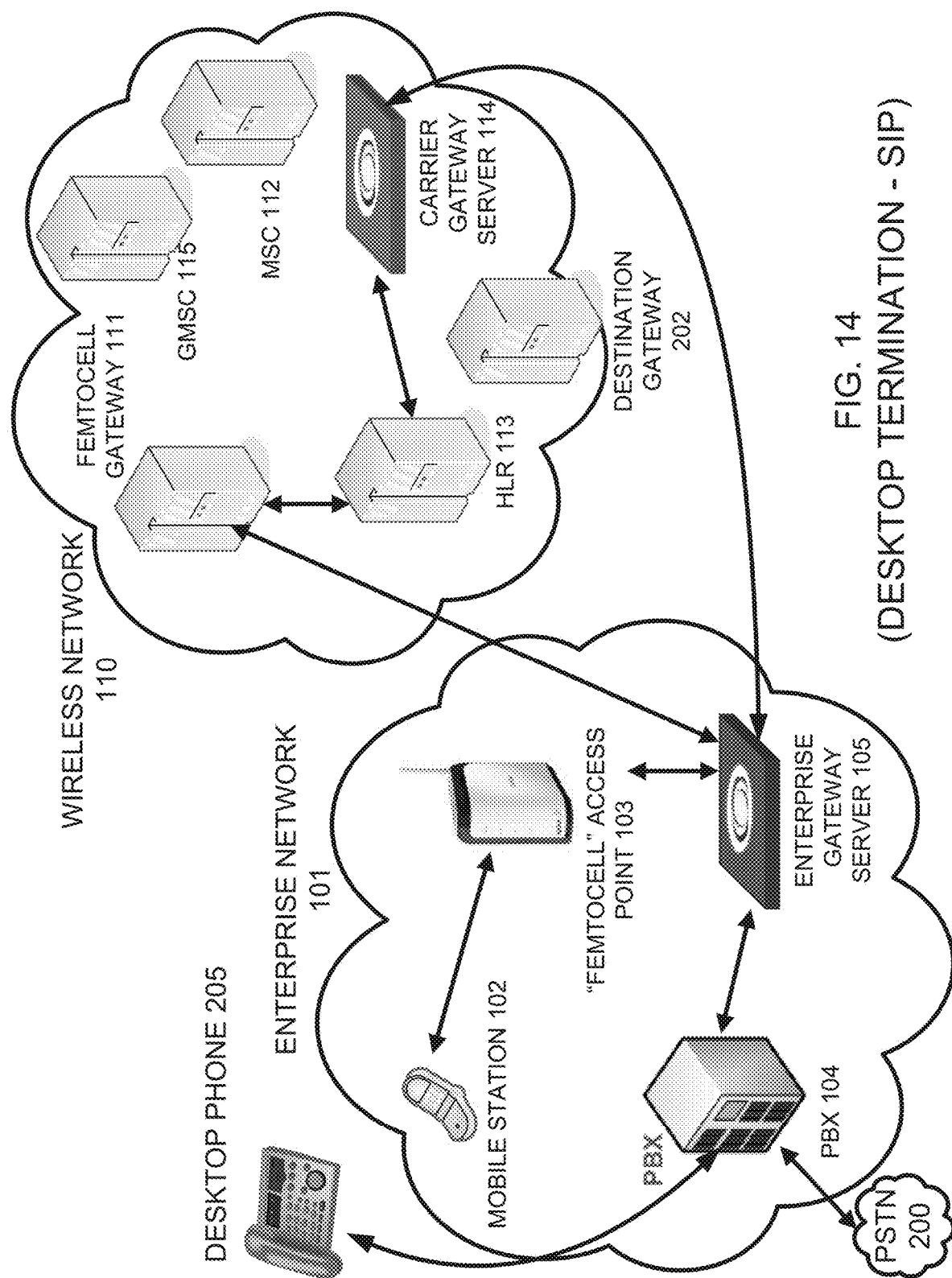
FIG. 14 illustrates a desktop termination network configuration, according to example embodiments of the present invention.

FIG. 14 illustrates an example of a desktop termination procedure implementing session initiation protocol (SIP), according to example embodiments of the present invention. Referring to FIG. 14, a call is received at the PBX 104 from an outside source with an intended recipient of the desktop phone 205. The call is forked to the desktop phone 205 and the enterprise gateway server 105, which performs a routing number lookup by contacting the carrier gateway server 114. A location request may be performed by requesting location information from the HLR 113, which requests a temporary routing number from the femtocell gateway 111.

The routing number and location information are returned to the carrier gateway server 114 and to the enterprise gateway server 105, which uses the information to determine the mobile station 102 is located on the femtocell access point 103. The enterprise femtocell gateway 105 sends request to the femtocell gateway 111 for the specific femtocell identification of femtocell access point 103, which is returned to the enterprise gateway server 105. The enterprise gateway server 105 then sends an invite message to the femtocell gateway 111 to initiate a call termination destined for the mobile on femtocell access point 103. The femtocell gateway 111 then sends an invite to the enterprise gateway server 105 such that the femtocell gateway 111 will be part of the signaling path in case that a handover procedure is subsequently required. The enterprise gateway server 105 then sends an invite message to the femtocell access point 103 and the mobile station 102 is paged and/or called by the femtocell access point 103 to provide the mobile station 102 with call communications.

Figure 15:
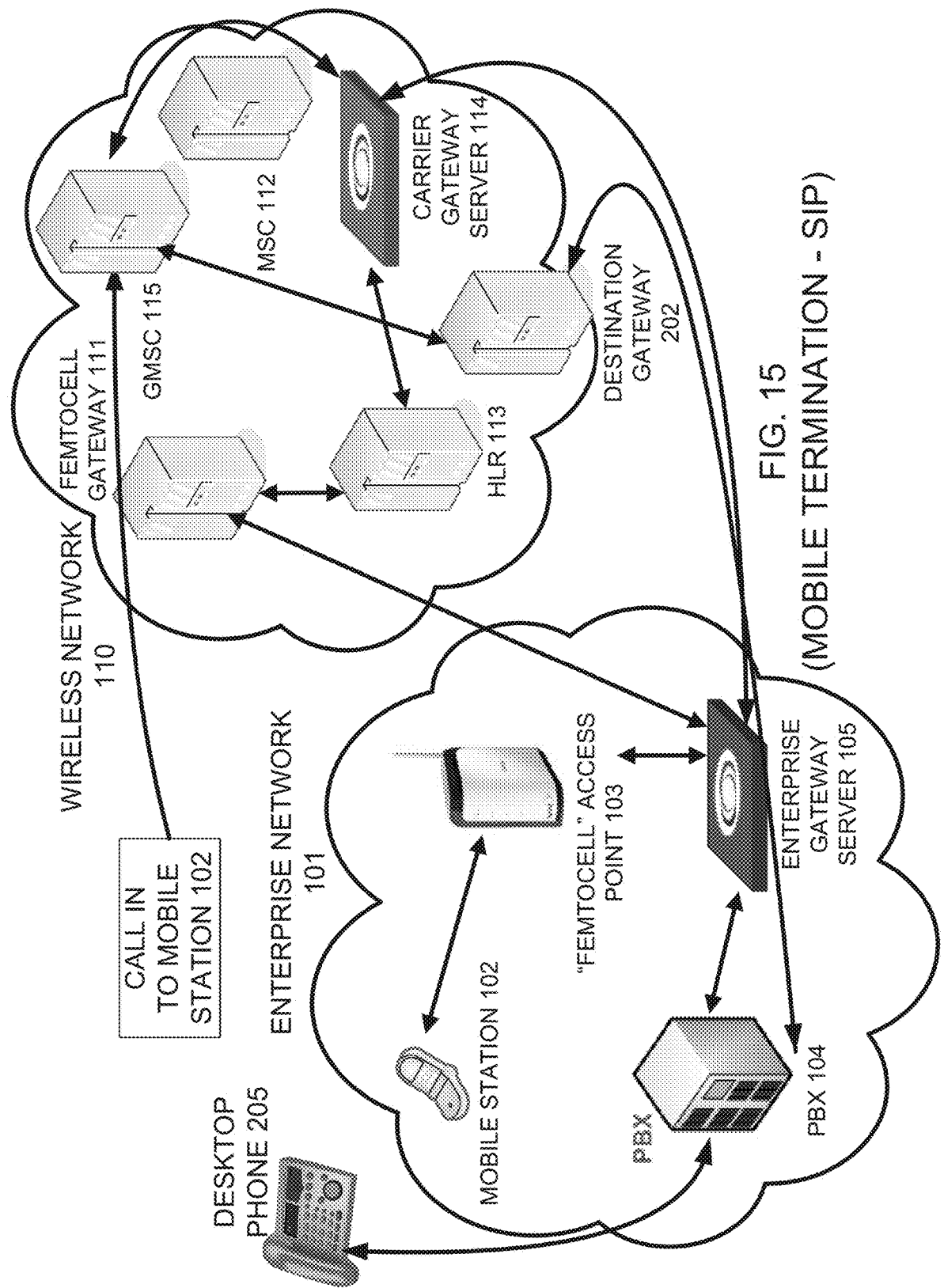
FIG. 15 illustrates an example mobile termination network configuration, according to example embodiments of the present invention.

FIG. 15 illustrates an example of a mobile termination procedure implementing session initiation protocol (SIP), according to example embodiments of the present invention. Referring to FIG. 15, a call to the mobile station 102 is received at the GMSC 115, which sends a termination trigger to the carrier gateway server 114 forming a connection between the GMSC 115 and the carrier gateway server 114. A mobile policy check is performed by communicating between the carrier gateway server 114 and the enterprise gateway server 105. The enterprise gateway server 105 responds to the carrier gateway server 114 with an order to the GMSC 115 to route a pilot number to the PBX 104. The GMSC 115 sends an invite to the carrier destination gateway 202, which routes to the PBX 104. On reception of the invite to the pilot number, the PBX 104 forks the call between the enterprise gateway server 105 and the desktop phone 205. The enterprise gateway server 105 then sends a request to route the call to the carrier gateway server 114 which sends the request to the HLR 113 which requests a temporary routing number from the femtocell gateway 111 where the mobile station 102 is located. The temporary routing number is returned to the HLR 113 which is returned to the carrier gateway server 114 which is returned to the enterprise gateway server 105.

The enterprise gateway server 105 uses the information to determine the mobile is located on a femtocell access point 103. The enterprise femtocell gateway 105 sends request to the femtocell gateway 111 for the specific femtocell identification of femtocell access point 103, which is returned to the enterprise gateway server 105. The enterprise gateway server 105 then sends an invite message to the femtocell gateway 111 to initiate a call termination destined for the mobile station 102 on femtocell access point 103. The femtocell gateway 111 then sends an invite to the enterprise gateway server 105 such that the femtocell gateway 111 will be part of the signaling path in case a handover procedure is subsequently required. The enterprise gateway server 105 then sends an invite message to the femtocell access point 103 and the mobile station 102 is paged and/or called by the femtocell access point 103 to provide the mobile station 102 with call communications.

Figure 16:
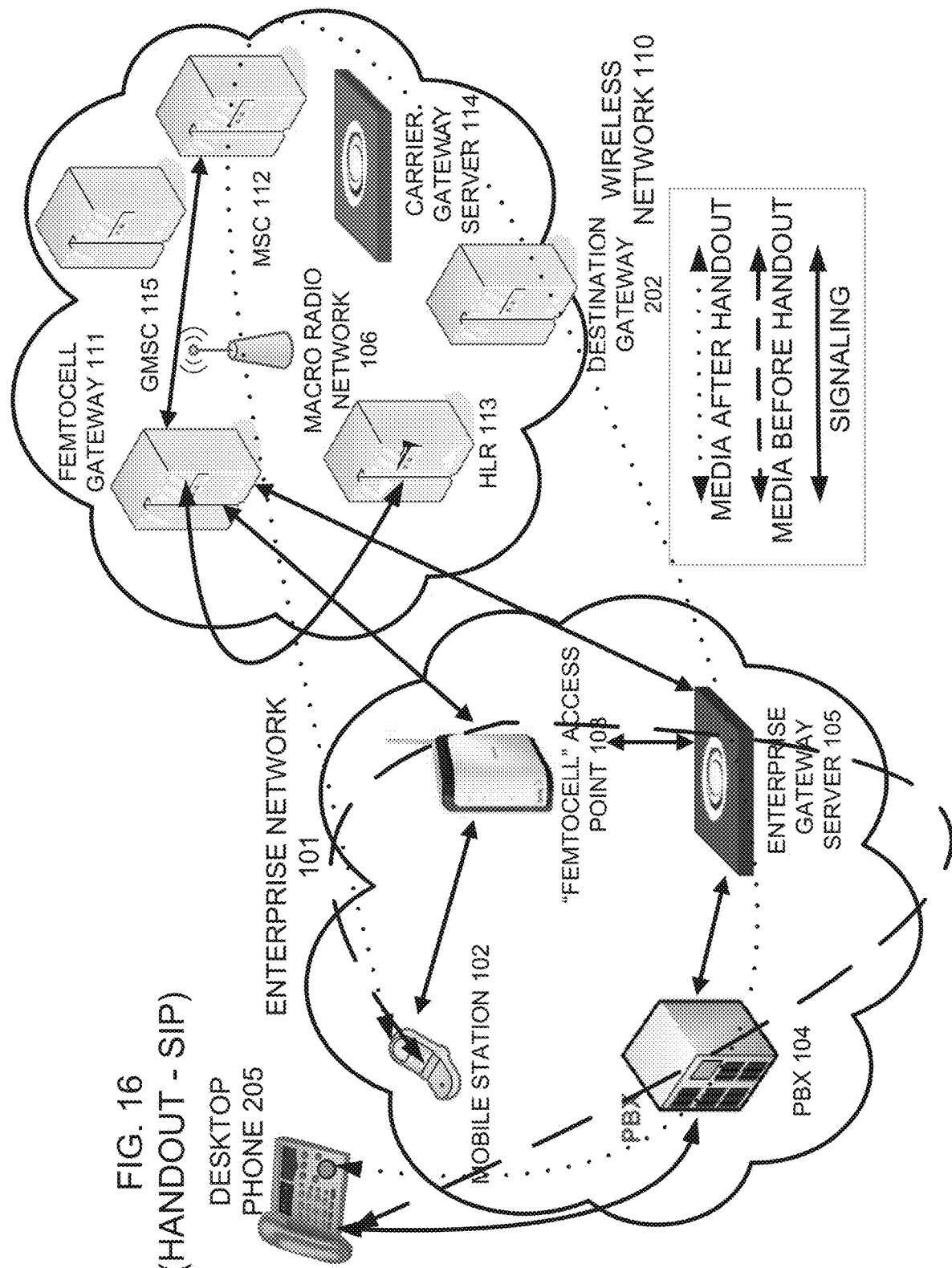
FIG. 16 illustrates a handout procedure network configuration, according to example embodiments of the present invention.

FIG. 16 illustrates an example of a handout procedure implementing session initiation protocol (SIP), according to example embodiments of the present invention. Referring to FIG. 16, three types of signaling are illustrated, the solid line represents the signaling communication paths between network elements before the handout event is performed, the dashed line represents the media bearer communications before the handout event is performed, and the dotted line represents the media bearer communications after the handout event is performed.

Beginning with the signaling, prior to the handout event, a call has been established such that media bearer communications are in progress between mobile station 102, femtocell access point 103, enterprise gateway server 105, PBX 104 and desktop phone 205. The mobile station 102 and femtocell access point 103 determine a handout procedure must take place as mobile station 102 begins to move out of radio coverage provided by femtocell access point 103 and into radio coverage provided by macro radio network 106.

Mobile station 102 initiates a handoff operation to the femtocell access point 103 which forwards the handoff to the femtocell gateway 111 which sends a request for an inter-MSC handoff to MSC 112 to which macro radio network 106 is connected. MSC 112 routing number back to the femtocell gateway 111 for the handoff procedure. An invite is sent by femtocell gateway 111 to the destination gateway 202 to connect the destination gateway 202 with MSC 112 via the routing number provided by MSC 112. Femtocell gateway 111 sends a re-invite to order enterprise gateway 105 to re-route the media bearer communication between the enterprise gateway server 105 and the femtocell access point 103 to destination gateway 202. As such, the media bearer path is transferred from desktop phone 205 to PBX 104 to enterprise gateway server 105 to destination gateway 202 to MSC 112 to macro radio network 106 to mobile station 102. Once the media bearer communication has been transferred to the new communication path after handout, the bearer path before handout from mobile station 102 to femtocell access point 103 to enterprise gateway server 105 is released.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 20 illustrates an example network element 2000, which may represent any of the above-described network components 102, 103, 104, 105, 106, 112, 113, 114, 115, 201, 202 and 203.

Figure 20:
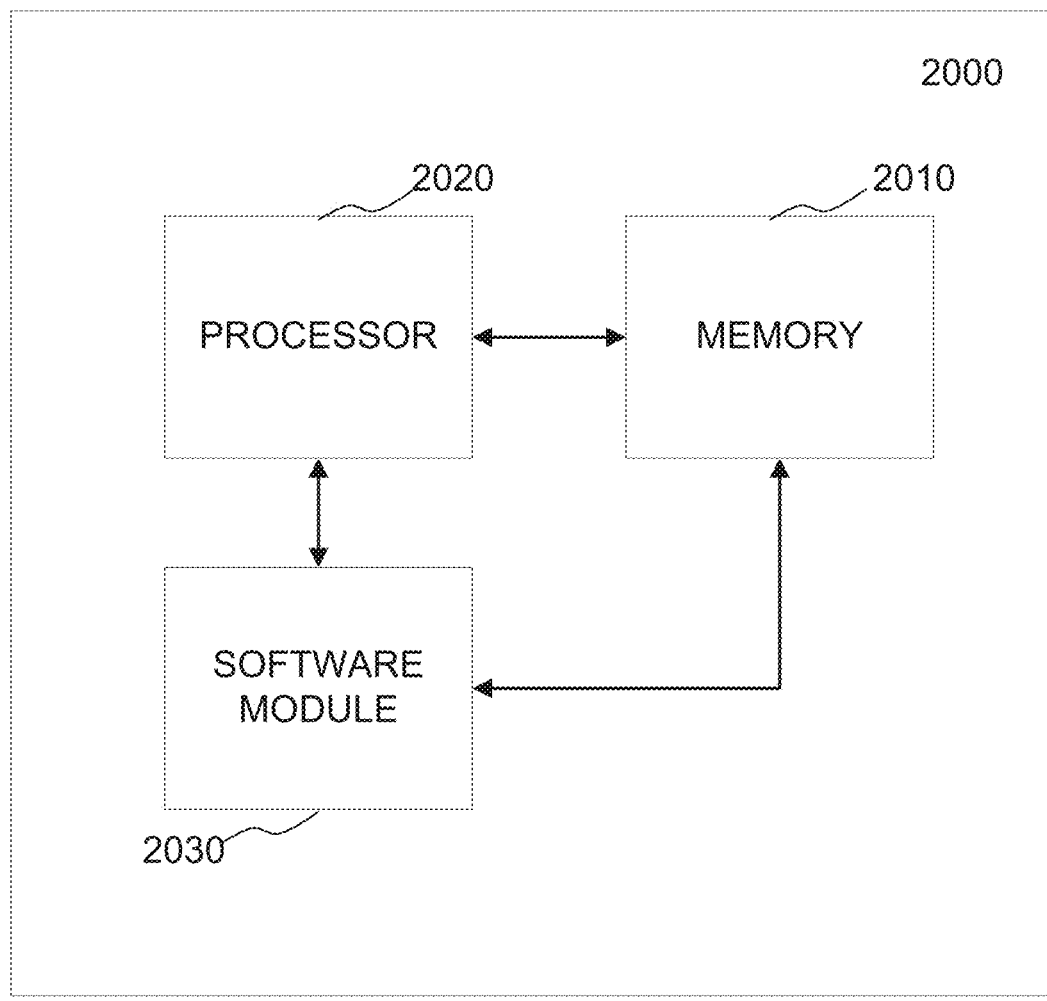
FIG. 20 illustrates an example network entity, receiver and/or transmitter configured to store software instructions and perform example operations disclosed throughout the specification.

As illustrated in FIG. 20, a memory 2010 and a processor 2020 may be discrete components of the network entity 2000 that are used to execute an application or set of operations. The application may be coded in software in a computer language understood by the processor 2020, and stored in a computer readable medium, such as, the memory 2010. The computer readable medium may be a non-transitory computer readable medium that includes tangible hardware components in addition to software stored in memory. Furthermore, a software module 2030 may be another discrete entity that is part of the network entity 2000, and which contains software instructions that may be executed by the processor 2020. In addition to the above noted components of the network entity 2000, the network entity 2000 may also have a transmitter and receiver pair configured to receive and transmit communication signals (not shown).

Figure 17:
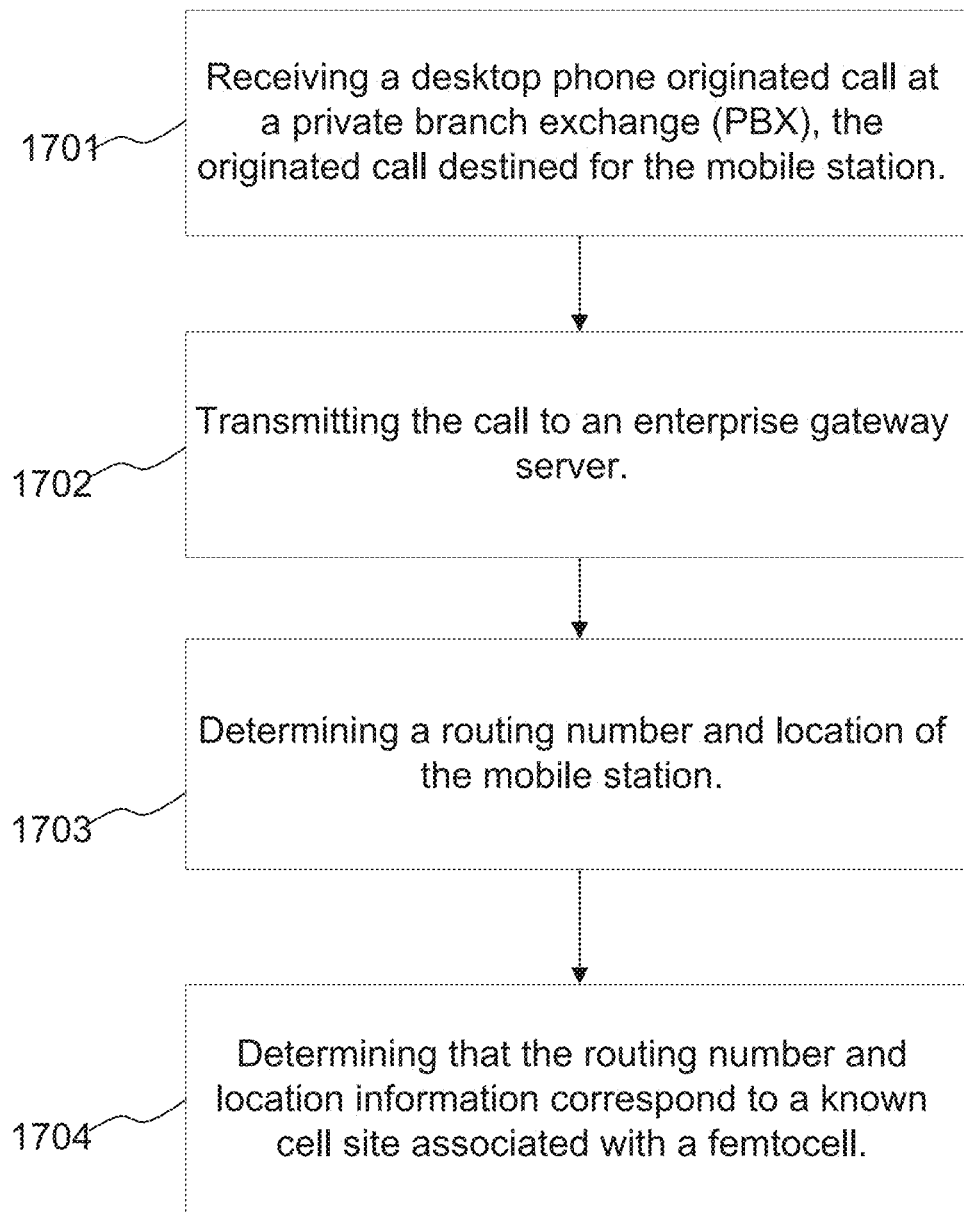
FIG. 17 illustrates an example method according to example embodiments of the present invention.

One example method of a call from a desktop phone to a mobile station is illustrated in FIG. 17. The method may include receiving a desktop phone originated call at a private branch exchange (PBX), the originated call being destined being the mobile station, at operation 1701. The method may also include transmitting the call to an enterprise gateway server, at operation 1702, and determining a routing number and location of the mobile station, at operation 1703. The method may also include determining that the routing number and location information correspond to a known cell site associated with a femtocell, at operation 1704.

Figure 18:
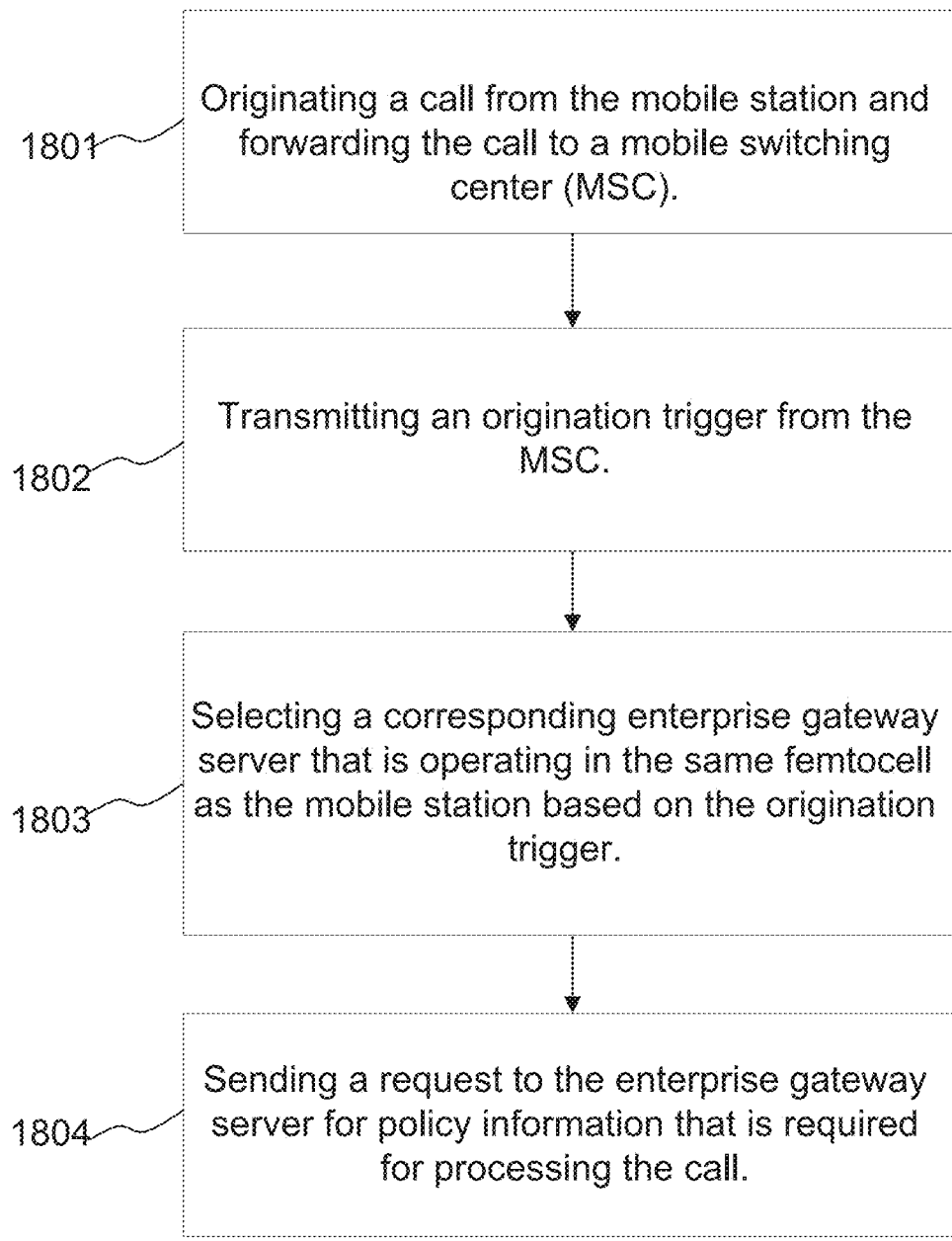
FIG. 18 illustrates another example method according to example embodiments of the present invention.

Another example method of routing a call from a mobile station is illustrated in FIG. 18. The method may include originating a call from the mobile station operating on a femtocell access point connected to a femtocell gateway, and forwarding the call to a mobile switching center (MSC), at operation 1801. The method may also include transmitting an origination trigger from the MSC, at operation 1802, to a carrier gateway server that subsequently sends a request to an enterprise gateway server for instructions to route the call at operation 1803. The method may further include the enterprise gateway server communicating with the femtocell gateway to have the femtocell access point redirect the call to the enterprise gateway server, at operation 1804. The method may further include the enterprise gateway server routing the call onto a final destination via the PBX at operation 1805.

Figure 19:
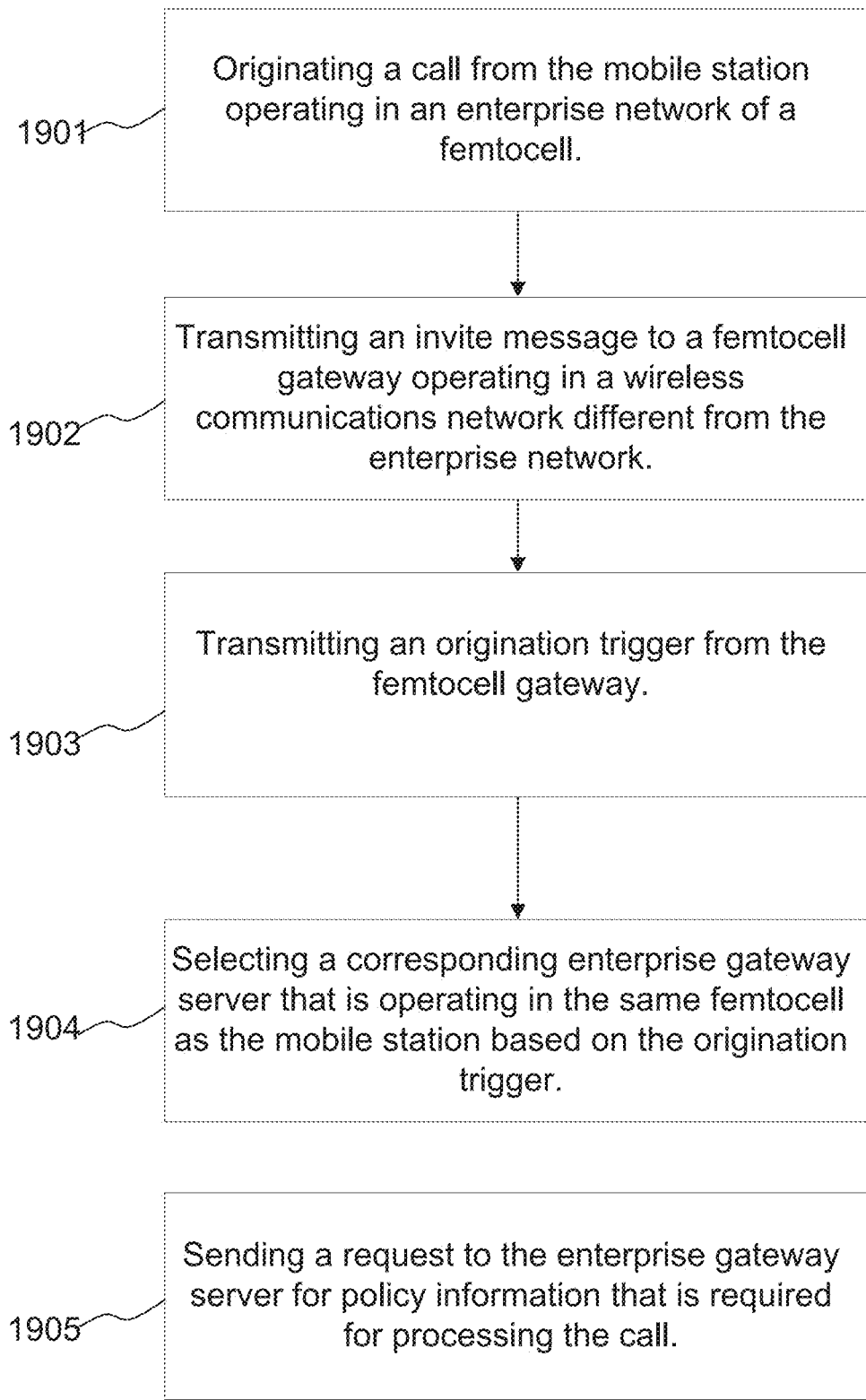
FIG. 19 illustrates yet another example method according to example embodiments of the present invention.

Another example embodiment of the present invention is illustrated in FIG. 19, which includes a method of routing a call from a mobile station. The method may include originating a call from the mobile station operating in an enterprise network of a femtocell, at operation 1901. The method may also include transmitting an invite message to a femtocell gateway server operating in a wireless communications network different from the enterprise network, at operation 1902, and transmitting an origination trigger from the femtocell gateway server, at operation 1903. Them method may also include selecting a corresponding enterprise femtocell gateway server that is operating in the same femtocell as the mobile station based on the origination trigger, at operation 1904, and sending a request to the enterprise femtocell gateway server for policy information that is required for processing the call, at operation 1905.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
   receiving, by a femtocell gateway of a carrier network and from a femtocell access point of an enterprise network, a handoff operation for a call between a first communication device in the enterprise network and a second communication device, the femtocell access point controlling an initiation of the handoff operation based on a policy received from an enterprise gateway server of the enterprise network;
   receiving, by the femtocell gateway, a routing number from a mobile switching center of the carrier network in response to a request from the femtocell access point;
   connecting, by the femtocell gateway, destination gateway of the carrier network to the mobile switching center via the routing number; and
   rerouting, by the femtocell gateway, a communication path of the call from being between the enterprise gateway server and the femtocell access point to being between the enterprise gateway server and the destination server.

2. The method of claim 1, wherein the policy allows the handoff.

3. The method of claim 1, wherein the policy denies the handoff.

4. The method of claim 3, wherein the policy denying the handoff is based on identifying that use of the first communication device is restricted to the enterprise network.

5. The method of claim 1, further comprising:
   querying, by the femtocell access point of the enterprise network, the enterprise gateway server for the policy before the initiation of the handoff.

6. The method of claim 1, further comprising:
   identifying, by the femtocell access point, that the handoff operation is required based on the first communication device leaving a coverage area of the femtocell access point and moving into a coverage area of a macro radio network connected to the carrier network.

7. A femtocell gateway of a carrier network, the femtocell gateway comprising:
   a processor that when executing instructions stored in a memory is configured to:
   receive a handoff operation for a call between a first communication device in the enterprise network and a second communication device from a femtocell access point of an enterprise network, the femtocell access point configured to control an initiation of the handoff operation based on a policy received from an enterprise gateway server of the enterprise network;
   receive a routing number from a mobile switching center of the carrier network in response to a request from the femtocell access point;
   connect a destination gateway of the carrier network to the mobile switching center via the routing number; and
   reroute a communication path of the call from being between the enterprise gateway server and the femtocell access point to being between the enterprise gateway server and the destination server.

8. The femtocell gateway of claim 7, wherein the policy allows the handoff.

9. The femtocell gateway of claim 7, wherein the policy denies the handoff.

10. The femtocell gateway of claim 9, wherein the policy that denies the handoff further comprises:
    a policy based on an identification that use of the first communication device is restricted to the enterprise network.

11. The femtocell gateway of claim 7, wherein the femtocell access point is configured to query the enterprise gateway server for the policy before the initiation of the handoff.

12. The femtocell gateway of claim 7, wherein the femtocell access point identifies that the first communication device has migrated from a coverage area of the femtocell access point to a coverage area of a macro radio network connected to the carrier network.

13. A non-transitory computer readable medium comprising instructions that when executed by a processor of a femtocell gateway of a carrier network configure the processor to perform:
    receiving, from a femtocell access point of an enterprise network, a handoff operation for a call between a first communication device in the enterprise network and a second communication device, the femtocell access point controlling an initiation of the handoff operation based on a policy received from an enterprise gateway server of the enterprise network;

receiving a routing number from a mobile switching center of the carrier network in response to a request from the femtocell access point;

connecting a destination gateway of the carrier network to the mobile switching center via the routing number; and rerouting a communication path of the call from being between the enterprise gateway server and the femtocell access point to being between the enterprise gateway server and the destination server.

14. The non-transitory computer readable medium of claim 13, wherein the policy allows the handoff.

15. The non-transitory computer readable medium of claim 13, wherein the policy denies the handoff.

16. The non-transitory computer readable medium of claim 15, wherein the policy that denies the handoff further comprises:

a policy that identifies that use of the first communication device is restricted to the enterprise network.

17. The non-transitory computer readable medium of claim 13, wherein the femtocell access point identifies that the handoff operation is required based on first communication device leaving a coverage area of the femtocell access point and moving into a coverage area of a macro radio network connected to the carrier network.

* * * * *